(12) United States Patent
Cho et al.

(10) Patent No.: US 12,555,288 B2
(45) Date of Patent: Feb. 17, 2026

(54) CONTROLLABLE DIFFUSION MODEL

(71) Applicant: ADOBE INC., San Jose, CA (US)

(72) Inventors: Wonwoong Cho, West Lafayette, IN (US); Hareesh Ravi, San Jose, CA (US); Midhun Harikumar, Sunnyvale, CA (US); Vinh Ngoc Khuc, Campbell, CA (US); Krishna Kumar Singh, San Jose, CA (US); Jingwan Lu, Sunnyvale, CA (US); Ajinkya Gorakhnath Kale, San Jose, CA (US)

(73) Assignee: ADOBE INC., San Jose, CA (US)

( * ) Notice: Subject to any disclaimer, the term of this patent is extended or adjusted under 35 U.S.C. 154(b) by 214 days.

(21) Appl. No.: 18/459,526

(22) Filed: Sep. 1, 2023

(65) Prior Publication Data

US 2025/0078349 A1  Mar. 6, 2025

(51) Int. Cl.
*G09G 5/00* (2006.01)
*G06T 11/40* (2006.01)
*G06T 11/60* (2006.01)

(52) U.S. Cl.
CPC .............. *G06T 11/60* (2013.01); *G06T 11/40* (2013.01)

(58) Field of Classification Search
CPC ......... G06T 11/60; G06T 11/40; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06F 9/4443; G06F 3/0481; G06F 30/13; G06F 3/04845; G06F 3/04883; G06F 40/143; G06F 16/54; G06F 16/56; G06F 16/5838; G06F 16/58; G06F 16/55; G06F 40/40; G06V 20/20; G06V 10/7753;
(Continued)

(56) References Cited

U.S. PATENT DOCUMENTS 10,504,267 B2 * 12/2019 Simons ................ G06V 40/171
2020/0160154 A1 * 5/2020 Taslakian ................. G06N 3/08
(Continued)

OTHER PUBLICATIONS

Cho, et al., "Towards Enhanced Controllability of Diffusion Models", arXiv preprint arXiv:2302.14368v2 [cs.CV] Mar. 15, 2023, 28 pages.
(Continued)

*Primary Examiner* — Gordon G Liu
(74) *Attorney, Agent, or Firm* — F. CHAU & ASSOCIATES, LLC

(57) ABSTRACT

A method, apparatus, and non-transitory computer readable medium for image generation are described. Embodiments of the present disclosure obtain a content input and a style input via a user interface or from a database. The content input includes a target spatial layout and the style input includes a target style. A content encoder of an image processing apparatus encodes the content input to obtain a spatial layout mask representing the target spatial layout. A style encoder of the image processing apparatus encodes the style input to obtain a style embedding representing the target style. An image generation model of the image processing apparatus generates an image based on the spatial layout mask and the style embedding, where the image includes the target spatial layout and the target style.

20 Claims, 16 Drawing Sheets

(58) Field of Classification Search
CPC .. G11B 27/10; H04N 21/47217; G16H 30/20; G06N 20/20; G06N 3/045; G06N 3/047; G06N 3/08; G06Q 30/0643
USPC .......................................................... 345/619
See application file for complete search history.

(56) References Cited

U.S. PATENT DOCUMENTS

| | | | |
|---|---|---|---|
| 2021/0264236 A1* | 8/2021 | Xu | G06V 10/774 |
| 2023/0162409 A1* | 5/2023 | Yu | G06T 3/40 345/660 |
| 2023/0351566 A1* | 11/2023 | Jeon | G06V 10/513 |

OTHER PUBLICATIONS

Balaji, et al., "eDiff-I: Text-to-Image Diffusion Models with an Ensemble of Expert Denoisers", arXiv preprint arXiv:2211.01324v5 [cs.CV] Mar. 14, 2023, 24 pages.
Ho, et al., "Denoising Diffusion Probabilistic Models", Advances in Neural Information Processing Systems, 33:6840-6851, 2020.
Kwon, et al. "Diagonal Attention and Style-Based GAN for Content-Style Disentanglement in Image Generation and Translation", In Proceedings of the IEEE/CVF International Conference on Computer Vision, pp. 13980-13989, 2021.
Preechakul, et al., "Diffusion Autoencoders: Toward a Meaningful and Decodable Representation", In Proceedings of the IEEE/CVF Conference on Computer Vision and Pattern Recognition, pp. 10619-10629, 2022.
Rombach, et al., "High-Resolution Image Synthesis with Latent Diffusion Models", In Proceedings of the IEEE/CVF Conference on Computer Vision and Pattern Recognition, pp. 10684-10695, 2022.

* cited by examiner

CONTROLLABLE DIFFUSION MODEL

BACKGROUND

The following relates generally to machine learning, and more specifically to machine learning for image processing. Digital image processing refers to the use of a computer to edit a digital image using an algorithm or a processing network. In some cases, image processing software can be used for various image processing tasks, such as image editing, image restoration, image generation, etc. Some image processing systems may implement machine learning techniques, for example, to perform tasks using predictive models (e.g., without explicitly programing the system for each task), to perform tasks with more accuracy or in less time, to perform tasks using special-purpose hardware, etc.

Image generation (a subfield of digital image processing) includes the use of a machine learning model to generate images. Diffusion-based models are one category of machine learning models that can be used to generate images. Specifically, diffusion models can be trained to take random noise as input and generate new images with features similar to the training data.

SUMMARY

The present disclosure describes systems and methods for image generation. Embodiments of the present disclosure include an image processing apparatus that generates a synthesized image (e.g., a style-transferred image) based on a content image and a style image. The image processing apparatus performs diffusion-based image generation by jointly learning a content latent space and a style latent space and training an image generation model (e.g., a diffusion model). In some embodiments, the image processing apparatus includes a content encoder and a style encoder. The content encoder outputs a spatial layout mask while the style encoder outputs a flattened semantic code (i.e., style embedding) to condition the diffusion model during training. The spatial layout mask and the style embedding are two separate conditional inputs for subsequent image generation. For example, the spatial layout mask and style embedding are input to the diffusion model (e.g., denoising U-Net) to ensure the diffusion model encodes different semantic aspects of an image. Accordingly, the efficiency and accuracy of content-preserving style transfer or image-to-image translation are increased.

A method, apparatus, and non-transitory computer readable medium for image processing are described. One or more embodiments of the method, apparatus, and non-transitory computer readable medium include obtaining a content input and a style input, wherein the content input comprises a target spatial layout and the style input comprises a target style; encoding, by a content encoder, the content input to obtain a spatial layout mask representing the target spatial layout; encoding, by a style encoder, the style input to obtain a style embedding representing the target style; and generating, by an image generation model, an image based on the spatial layout mask and the style embedding, wherein the image includes the target spatial layout and the target style.

A method, apparatus, and non-transitory computer readable medium for image processing are described. One or more embodiments of the method, apparatus, and non-transitory computer readable medium include initializing a content encoder, a style encoder, and an image generation model; receiving training data including an image comprising spatial content and a style attribute; computing an objective function based on the spatial content and the style attribute; and jointly training the content encoder, the style encoder, and the image generation model using an end-to-end process based on the objective function.

An apparatus and method for image processing are described. One or more embodiments of the apparatus and method include at least one processor; at least one memory including instructions executable by the at least one processor; a content encoder comprising parameters stored in the at least one memory and trained to encode a content input to obtain a spatial layout mask representing a target spatial layout; a style encoder comprising parameters stored in the at least one memory and trained to encode a style input to obtain a style embedding representing a target style; and an image generation model comprising parameters stored in the at least one memory and trained to generate an image based on the spatial layout mask and the style embedding, wherein the image includes the target spatial layout and the target style.

DETAILED DESCRIPTION

Figure 1:
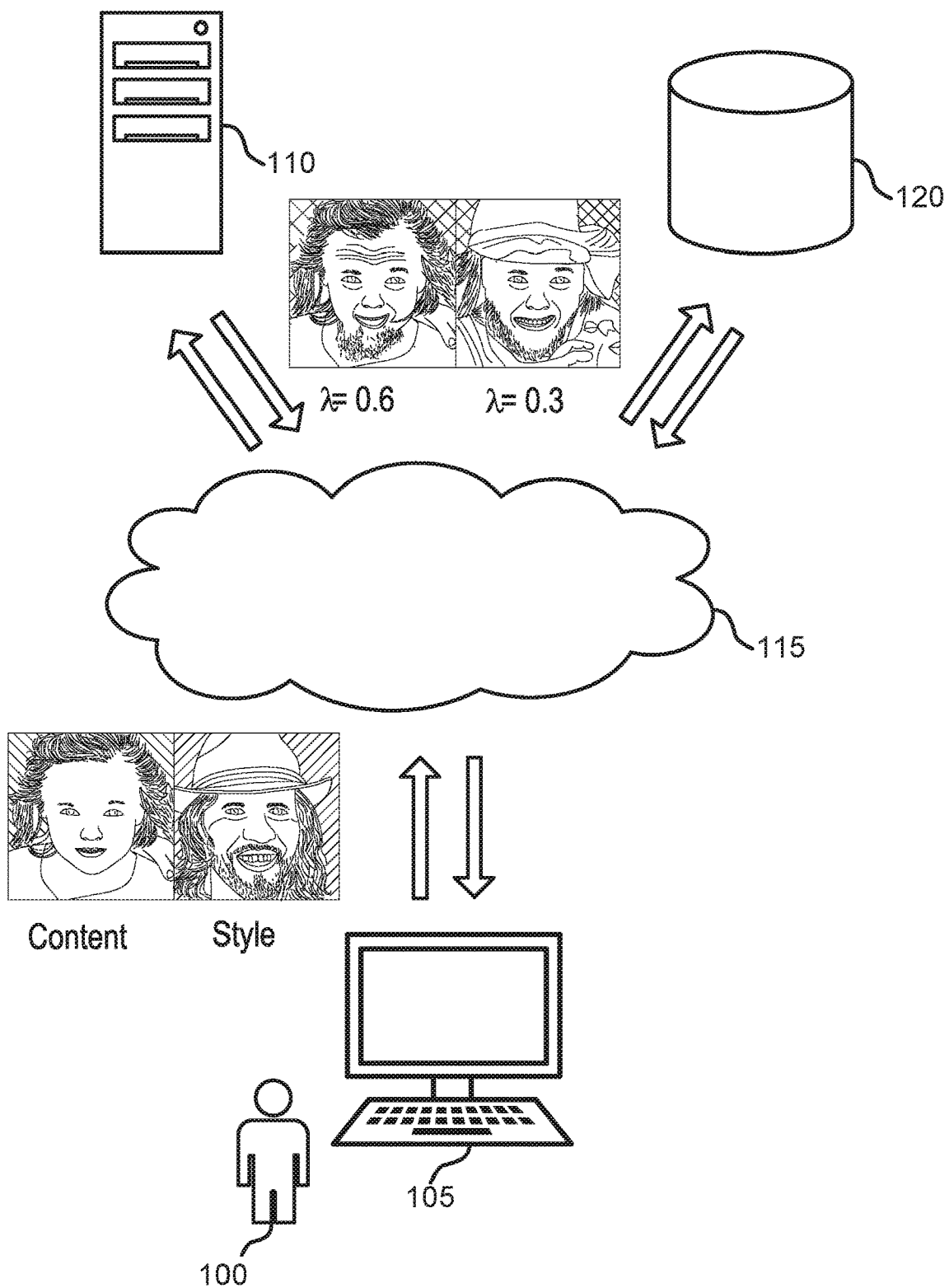
FIG. 1 shows an example of an image processing system according to aspects of the present disclosure.

The present disclosure describes systems and methods for image generation. Embodiments of the present disclosure include an image processing apparatus that generates a synthesized image (e.g., a style-transferred image) based on a content image and a style image. The image processing apparatus performs diffusion-based image generation by jointly learning a content latent space and a style latent space and training an image generation model (e.g., a diffusion model). In some embodiments, the image processing apparatus includes a content encoder and a style encoder. The content encoder outputs a spatial layout mask while the style encoder outputs a flattened semantic code (i.e., style embedding) to condition the diffusion model during training. The spatial layout mask and the style embedding are two separate conditional inputs for subsequent image generation. For example, the spatial layout mask and style embedding are input to the diffusion model (e.g., denoising U-Net) to ensure the diffusion model encodes different semantic aspects of an image. Accordingly, the efficiency and accuracy of content-preserving style transfer or image-to-image translation are increased.

Diffusion models are a class of generative neural networks that can be trained to generate new data with features similar to features found in training data. Diffusion models can be used in image completion tasks, such as image inpainting. In some examples, however, diffusion models may generate poor results when they are limited to taking only text information as a condition for image generation tasks. Conventional models have not incorporated learning multiple latent spaces. These models often fail to provide controllability in tasks such as image synthesis, domain adaptation, style transfer and interpretability, etc.

Most conditional diffusion models (e.g., DALLE2, Imagen, Parti) depend on pre-trained CLIP or similar embeddings that cannot do well with controllability or editability. For example, conventional diffusion models depend on certain pre-generated embeddings that are not flexible for editing. In some examples, autoencoder based models learn a semantic space and provide for image manipulation. Additionally, conventional systems capture information in a single latent space that isolating attributes for image manipulation is not possible.

Embodiments of the present disclosure include an image processing apparatus configured to generate a synthesized image based on a style input (e.g., a style image) and a content input (e.g., a content image). The content input includes a target spatial layout and the style input includes a target style. A content encoder of the image processing apparatus is trained to generate a spatial layout mask representing the target spatial layout. A style encoder of the image processing apparatus is trained to generate a style embedding representing the target style. The spatial layout mask and the style embedding are injected into an image generation model (e.g., a diffusion model) at different stages to encode different semantic factors of the style input and the content input. In some examples, the image generation model is a diffusion model having a U-Net structure. The output image from the diffusion model includes target style attributes from the style input and target structure attributes from the content input.

In some embodiments, a weight scheduler is incorporated to determine how much the content and the style conditions are applied to the denoising network. This way, the model is trained to learn low-frequency layout information in earlier steps and high-frequency details in the later steps of the reverse diffusion process. The image processing apparatus is configured to compute a content weight based on a diffusion timestep. The image processing apparatus is configured to compute a style weight based on a diffusion timestep. The output image is generated based on the spatial layout mask and the style embedding according to the content weight and style weight, respectively.

During inference time, one or more embodiments include timestep scheduling at the reverse diffusion stage to leverage the inductive bias of the diffusion model. For example, during the denoising process, structural information from the content input is injected into the initial steps (or first few steps) of the denoising process based on the content weight. Additionally, the style information from the style input is injected into the later steps of the denoising process, e.g., by gradually reducing content weight and increasing style weight. That is, adding a weight scheduler enables determining how much the content and the style conditions are applied to the denoising network. This way, the image generation model is trained to learn low-frequency layout information in earlier steps and high-frequency details in the later steps of the reverse diffusion process.

Accordingly, embodiments of the present disclosure generate high-quality synthesized images through increasing controllability and editability of diffusion models. At training, one or more embodiments jointly learn a content latent space, a style latent space together with training a diffusion model (e.g., U-Net). Furthermore, the image processing apparatus applies timestep scheduling that leads to increased performance in tasks such as reference-based image translation.

Embodiments of the present disclosure can be used in the context of image editing or image translation applications. For example, a machine learning model based on the present disclosure takes a content input and a style input and efficiently generates an output image (e.g., a synthesized image or content-preserving style-transferred image) that includes target style attributes from the style input and target content attributes from the content input. Example applications or use cases, according to some embodiments, are provided with reference to FIGS. 2-4. Details regarding the architecture of an example image processing apparatus are provided with reference to FIGS. 6-9. Example processes for image generation are provided with reference to FIGS. 2 and 5. Example training processes are described with reference to FIGS. 13-15.

Image Generation

In FIGS. 1-5, a method, apparatus, and non-transitory computer readable medium for image processing are described. One or more embodiments of the method, apparatus, and non-transitory computer readable medium include obtaining a content input and a style input, wherein the content input comprises a target spatial layout and the style input comprises a target style; encoding, by a content encoder, the content input to obtain a spatial layout mask representing the target spatial layout; encoding, by a style encoder, the style input to obtain a style embedding representing the target style; and generating, by an image generation model, an image based on the spatial layout mask and the style embedding, wherein the image includes the target spatial layout and the target style.

In some examples, the content input comprises a content image and the style input comprises a style image. Some examples of the method, apparatus, and non-transitory computer readable medium further include performing a spatial-wise operation based on the spatial layout mask, wherein the image is generated based on the spatial-wise operation.

Some examples of the method, apparatus, and non-transitory computer readable medium further include performing a channel-wise operation based on the style embedding, wherein the image is generated based on the channel-wise operation.

Some examples of the method, apparatus, and non-transitory computer readable medium further include computing a content weight based on a diffusion timestep, wherein the image is generated based on the spatial layout mask according to the content weight.

Some examples of the method, apparatus, and non-transitory computer readable medium further include computing a style weight based on a diffusion timestep, wherein the image is generated based on the style embedding according to the style weight.

Some examples of the method, apparatus, and non-transitory computer readable medium further include generating a noise vector, wherein the image is generated based on the noise vector using a reverse diffusion process.

In some examples, the style embedding includes global semantic information representing the target style. In some examples, the spatial layout mask includes a set of values corresponding to a set of locations of the content input, respectively, wherein the style embedding includes a tuple of values that together represent the target style.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 6.

In an example shown in FIG. 1, a content image (left) and a style image (right) are input and transmitted to image processing apparatus 110, e.g., via user device 105 and cloud 115. Image processing apparatus 110 encodes the content image, via a content encoder, to obtain a content image encoding. Image processing apparatus 110 encodes the style image, via a style encoder, to obtain a style image encoding. An image generation model (e.g., a diffusion model) of image processing apparatus 110 is trained together with the content encoder and the style encoder.

In some examples, the content encoder encodes the content input to obtain a spatial layout mask representing the target spatial layout. The style encoder encodes the style input to obtain a style embedding representing the target style. Image processing apparatus 110 generates one or more synthesized images based on the spatial layout mask and the style embedding. The synthesized image(s) includes the target spatial layout and the target style.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application for tasks such as style transfer, image translation, etc.). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image processing apparatus 110 obtains a content input and a style input, wherein the content input comprises a target spatial layout and the style input comprises a target style; encoding, by a content encoder, the content input to obtain a spatial layout mask representing the target spatial layout; encoding, by a style encoder, the style input to obtain a style embedding representing the target style; and generating, by an image generation model, an image based on the spatial layout mask and the style embedding, wherein the image includes the target spatial layout and the target style. The process of using the image processing apparatus 110 is further described with reference to FIG. 2.

Image processing apparatus 110 includes a computer implemented network comprising an image encoder, a content encoder, a style encoder, and an image generation model. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIGS. 6-9. Further detail regarding the operation of image processing apparatus 110 is provided with reference to FIGS. 2 and 5.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
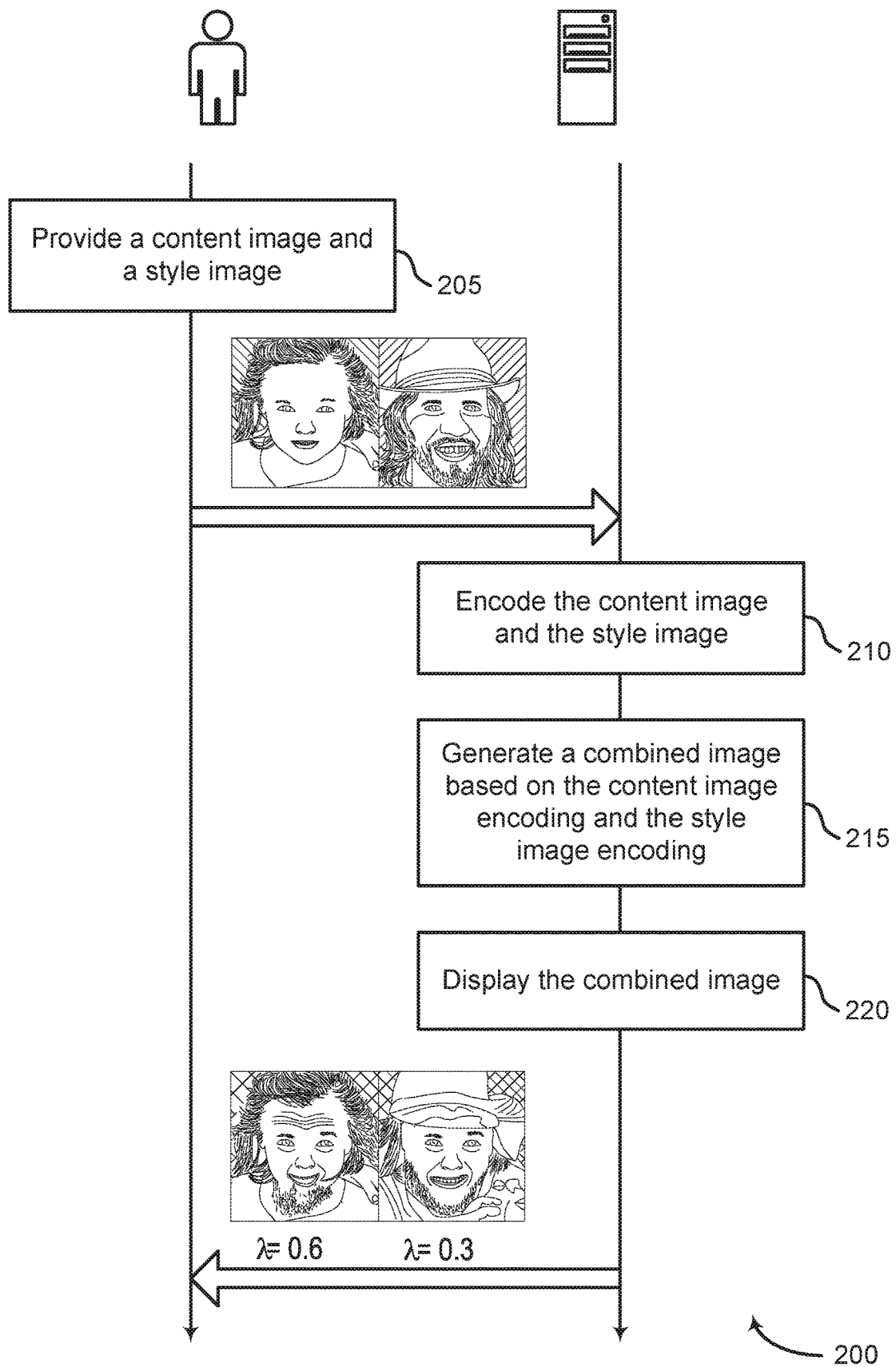
FIG. 2 shows an example of image generation application according to aspects of the present disclosure.

FIG. 2 shows an example of image generation application 200 according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides a content image and a style image. In some cases, the operations of this step refer to, or may be performed by, a user as described with reference to FIG. 1. In some examples, a content image includes a face of a child. A style image includes a face of an elder person. In some cases, the content image and/or the style image is retrieved from an online image database.

At operation 210, the system encodes the content image and the style image. In some cases, the operations of this step refer to, or may be performed by, an image processing apparatus as described with reference to FIGS. 1 and 6. In some embodiments, the image processing apparatus learns content and style latent space. For example, the image processing apparatus learns separate content and style latent spaces that correspond to different semantic factors of an image. This enables the apparatus to control these factors separately to perform reference-based image translation as well as controllable generation and image manipulation.

At operation 215, the system generates a combined image based on the content image encoding and the style image encoding. In some cases, the operations of this step refer to, or may be performed by, an image processing apparatus as described with reference to FIGS. 1 and 6. The combined image includes the target spatial layout from the content image and the target style from the style image. For example, the combined image includes a face of a person such that content-related or structural attributes of the face are similar to those of the content image. The style-related attributes (e.g., hairstyle, hat, beard, age) of the face are similar to those of the style image. That is, the style-related attributes are transferred from the style image to the combined image via generation.

At operation 220, the system displays the combined image. In some cases, the operations of this step refer to, or may be performed by, an image processing apparatus as described with reference to FIGS. 1 and 6.

Figure 3:
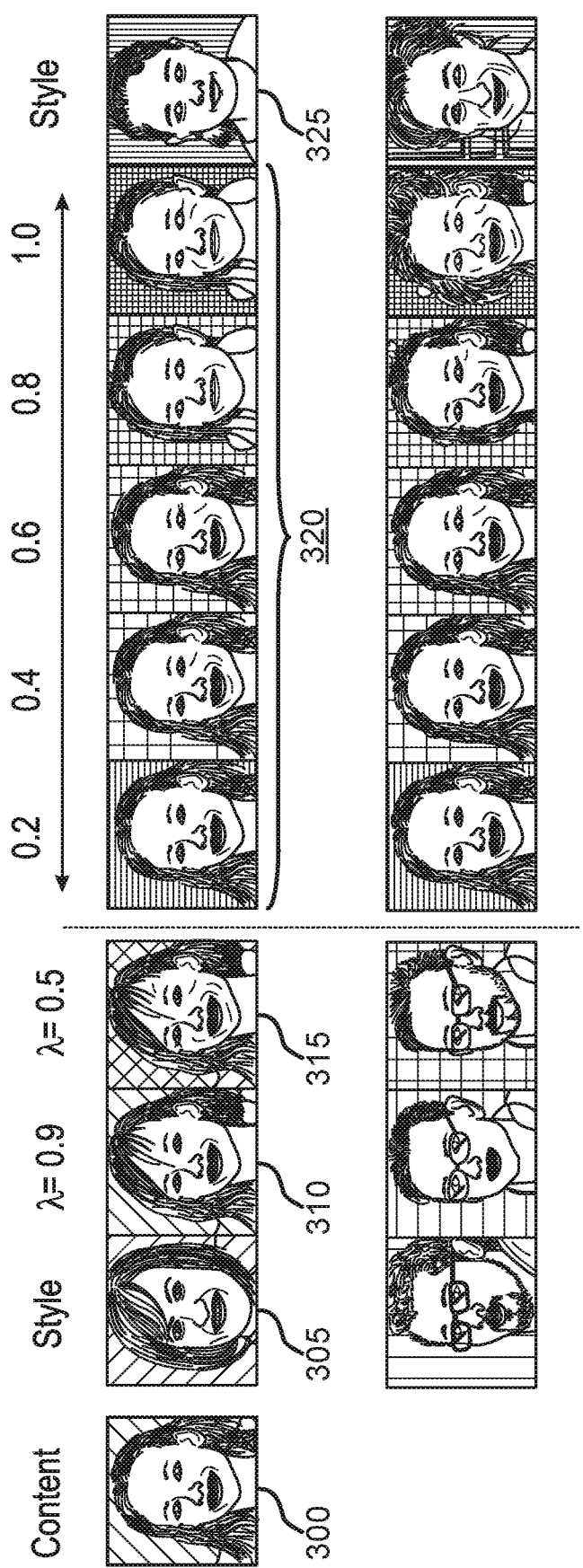
FIG. 3 shows an example of conditioning image generation according to aspects of the present disclosure.

FIG. 3 shows an example of conditioning image generation according to aspects of the present disclosure. The example shown includes content image 300, style image 305, first output image 310, second output image 315, synthesized images 320, and additional style image 325. Content image 300 is an example of, or includes aspects of, the corresponding element described with reference to FIGS. 4, 11, and 12. Style image 305 is an example of, or includes aspects of, the corresponding element described with reference to FIGS. 4, 11, and 12.

In some embodiments, a latent diffusion model is trained for image-to-image translation by conditioning on content latent space and style latent space. Inference-time techniques, generalized composable sampling, and timestep scheduling are used to increase controllability. Controlling in generalized composable diffusion model (GCDM) formulation results in different magnitudes of style translation. While fixing the content feature, applying convex combinations between the style features from content and style images show smooth interpolations.

In some examples, content image 300 depicts a face of a young female. Style image 305 depicts a face of a middle-aged female. The age attributes of content image 300 and style image 305 are different. Hair-related attributes of content image 300 and style image 305 are different. By setting $\lambda=0.9$, the image processing apparatus generates first output image 310. By setting $\lambda=0.5$, the image processing apparatus generates second output image 315.

First output image 310 includes the target spatial layout of content image 300 and the target style of style image 305. That is, first output image 310 depicts a face of a female. The woman in first output image 310 shows similar style-related attributes as in style image 305 while preserving structure-related attributes as in content image 300. First output image 310 is an example of, or includes aspects of, the corresponding element described with reference to FIGS. 4 and 11. Second output image 315 is an example of, or includes aspects of, the corresponding element described with reference to FIGS. 4 and 11.

In an embodiment, by changing values of $\lambda$ from 0 to 1, the image processing apparatus generates synthesized images 320 corresponding to the respective values of $\lambda$ based on additional style image 325. The image processing apparatus learns latent spaces that support smooth interpolations as shown by a set of synthesized images 320.

Figure 4:
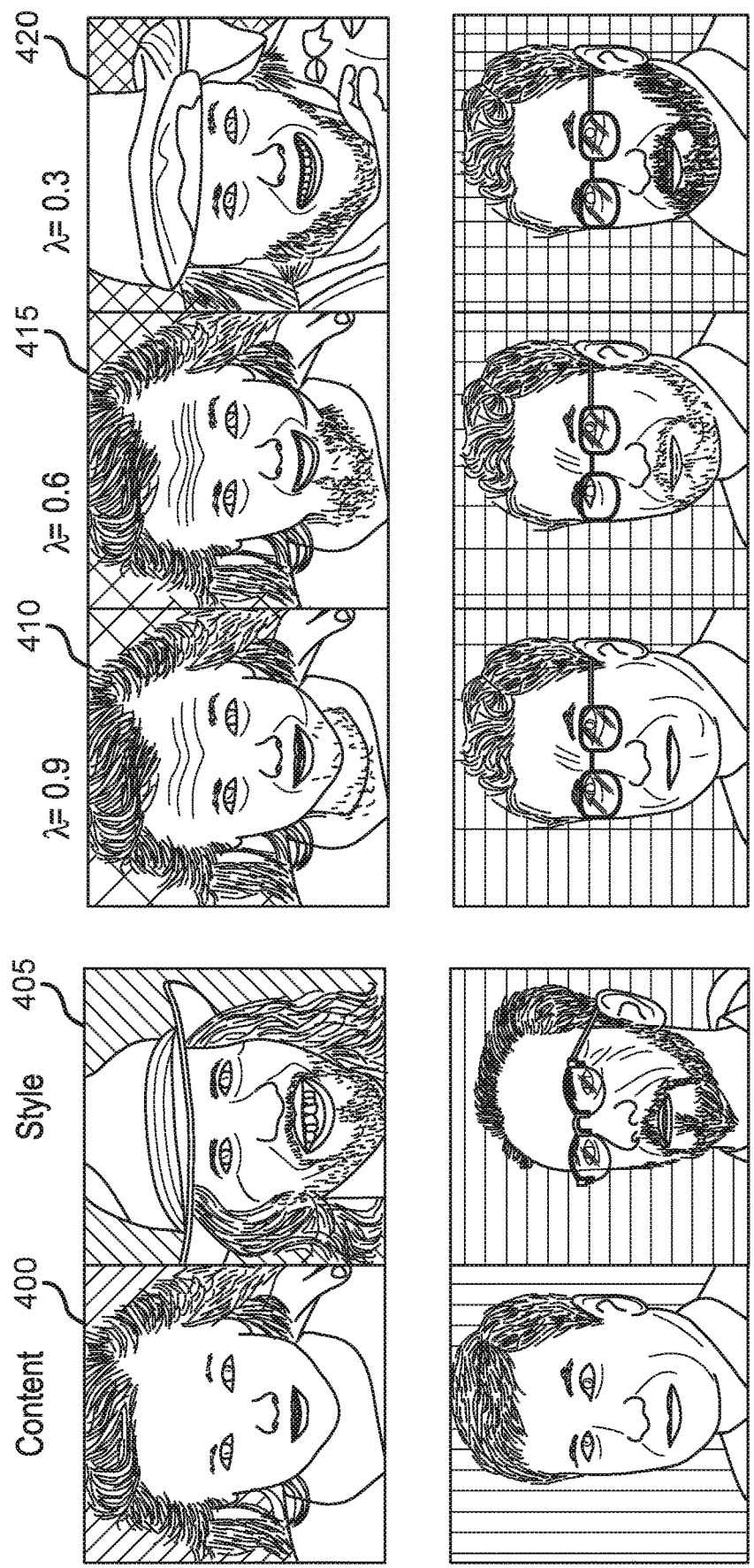
FIG. 4 shows an example of controllable image translation according to aspects of the present disclosure.

FIG. 4 shows an example of controllable image translation according to aspects of the present disclosure. The example shown includes content image 400, style image 405, first output image 410, second output image 415, and third output image 420. Content image 400 is an example of, or includes aspects of, the corresponding element described with reference to FIGS. 3, 11, and 12. Style image 405 is an example of, or includes aspects of, the corresponding element described with reference to FIGS. 3, 11, and 12.

In some embodiments, by modifying the value of A, the image processing apparatus is configured to control the extent of guidance being applied to diffusion-based image generation. Decreasing $\lambda$ leads to increased transfer of style effect from the style image 405 when $\beta_c=0$ and $\beta_s=1$, where $\beta_c$ and $\beta_s$ are the weights for respective conditional guidance. For example, the man in the second row has more wrinkles and beard as $\lambda$ decreases. That is, as $\lambda$ decreases from $\lambda=0.9$ to $\lambda=0.3$, the style-related effect from the style image increasingly contributes to output images. In another example, first output image 410 corresponds to a large $\lambda$ value and accordingly includes the least style effect from style image 405 among first output image 410, second output image 415, and third output image 420. Third output image 420 corresponds to a small $\lambda$ value and accordingly includes the most style effect from style image 405 among first output image 410, second output image 415, and third output image 420.

First output image 410 is an example of, or includes aspects of, the corresponding element described with reference to FIGS. 3 and 11. Second output image 415 is an example of, or includes aspects of, the corresponding element described with reference to FIGS. 3 and 11. Third output image 420 is an example of, or includes aspects of, the corresponding element described with reference to FIG. 11.

Figure 5:
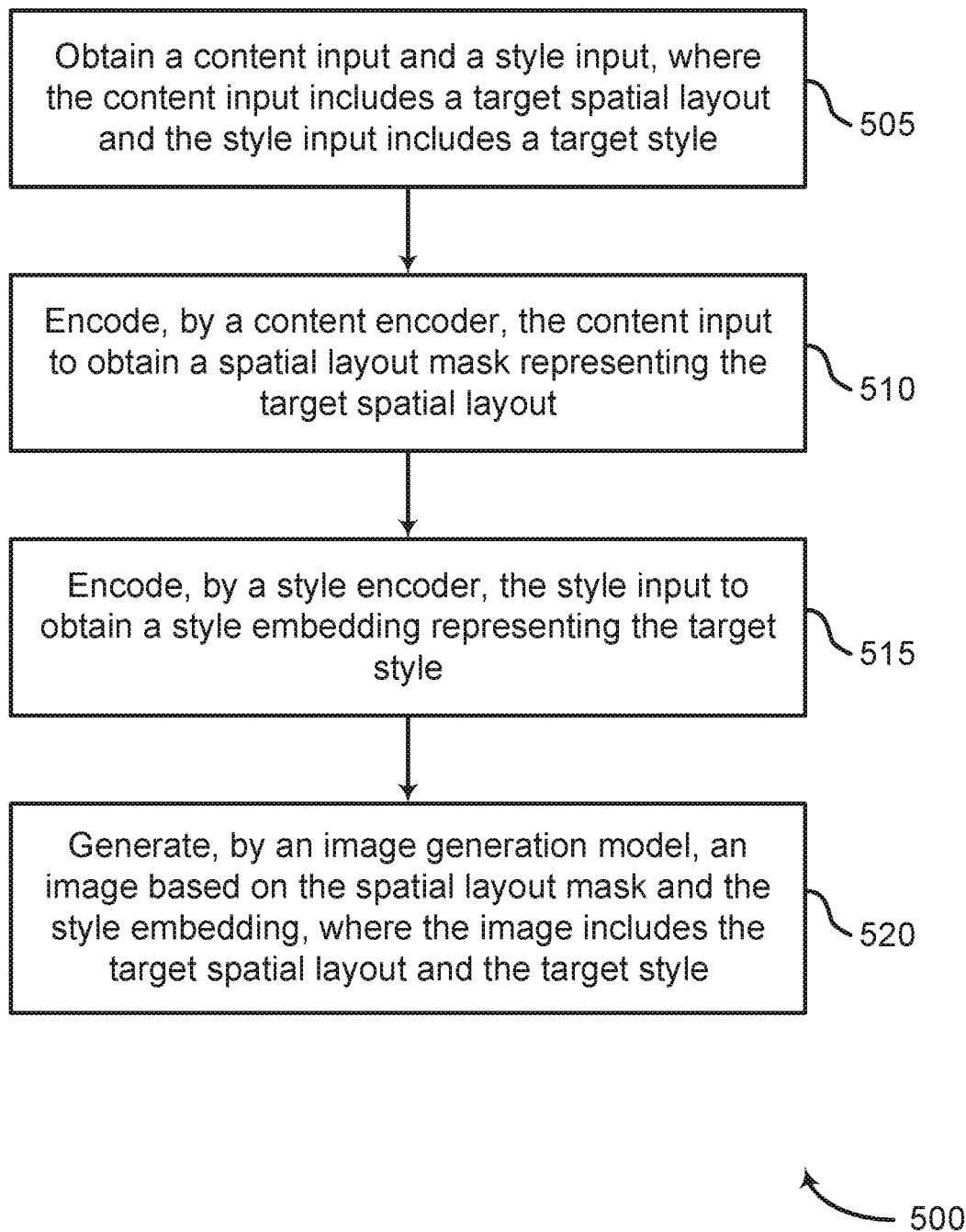
FIG. 5 shows an example of a method for image processing according to aspects of the present disclosure.

FIG. 5 shows an example of a method 500 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the system obtains a content input and a style input, where the content input includes a target spatial layout and the style input includes a target style. In some cases, the operations of this step refer to, or may be performed by, a machine learning model as described with reference to FIGS. 6 and 9.

At operation 510, the system encodes, by a content encoder, the content input to obtain a spatial layout mask representing the target spatial layout. In some cases, the operations of this step refer to, or may be performed by, a content encoder as described with reference to FIGS. 6 and 9.

At operation 515, the system encodes, by a style encoder, the style input to obtain a style embedding representing the target style. In some cases, the operations of this step refer to, or may be performed by, a style encoder as described with reference to FIGS. 6 and 9.

One or more embodiments learn two latent spaces to enhance controllability in diffusion models. The content encoder learns a spatial layout mask and the style encoder outputs a flattened semantic code to condition the diffusion model during training. The content and style codes are injected differently into the U-Net to ensure they encode different semantic factors of an image.

At operation 520, the system generates, by an image generation model, an image based on the spatial layout mask and the style embedding, where the image includes the target spatial layout and the target style. In some cases, the operations of this step refer to, or may be performed by, an image generation model as described with reference to FIGS. 6 and 9.

One or more embodiments increase the extent of controllability during generation such that the image generation model (e.g., a denoising U-Net) generates realistic, high quality, and diverse images. In some examples, a diffusion model is trained conditioned on two latent codes, i.e., a spatial content mask and a flattened style embedding. For example, the diffusion model is trained in reliance on the inductive bias of the progressive denoising process of diffusion models to encode pose/layout information in the spatial content mask (or spatial structure mask) and semantic/style information in the style code.

According to some embodiments, two sampling techniques are used to improve controllability of the diffusion model. In some cases, composable diffusion models are extended to enable dependence between conditional inputs. The extension of composable diffusion models improves the quality of generations and provides control over the amount of guidance from the two latent codes (i.e., a spatial content mask and a flattened style embedding) and their joint distribution.

In some embodiments, timestep dependent weight scheduling is applied to the content latent code and the style latent code to increase the controllability of the diffusion model. Performance of apparatus, systems and methods of the present disclosure have been evaluated, and results indicate embodiments of the present disclosure have obtained improved controllability over existing methods. The image processing apparatus is used for image editing and image translation tasks.

One or more embodiments apply the inductive bias of diffusion models that learns low-frequency layout information in earlier steps and high-frequency or imperceptible details in the later steps of the reverse diffusion process. Accordingly, the quality of the generated results are increased. In some examples, a predefined controllable timestep dependent weight schedule is used to compose the content and style codes during generation. This simulates the mixture of denoising experts by virtue of varying the conditional information (instead of the entire model) at different timesteps during inference.

Network Architecture

In FIGS. 6-12, an apparatus and method for image processing are described. One or more embodiments of the apparatus and method include at least one processor; at least one memory including instructions executable by the at least one processor; a content encoder comprising parameters stored in the at least one memory and trained to encode a content input to obtain a spatial layout mask representing a target spatial layout; a style encoder comprising parameters stored in the at least one memory and trained to encode a style input to obtain a style embedding representing a target style; and an image generation model comprising parameters stored in the at least one memory and trained to generate an image based on the spatial layout mask and the style embedding, wherein the image includes the target spatial layout and the target style.

In some examples, the content encoder includes a residual neural network. In some examples, the style encoder includes a residual neural network. In some examples, the image generation model includes a denoising unit. Some examples of the apparatus and method further include an image encoder configured to generate a latent code based on the image.

Some examples of the apparatus and method further include a timestep scheduling component configured to compute a content weight based on a diffusion timestep, wherein the image is generated based on the spatial layout mask according to the content weight, and to compute a style weight based on the diffusion timestep, wherein the image is generated based on the style embedding according to the style weight.

A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

Figure 6:
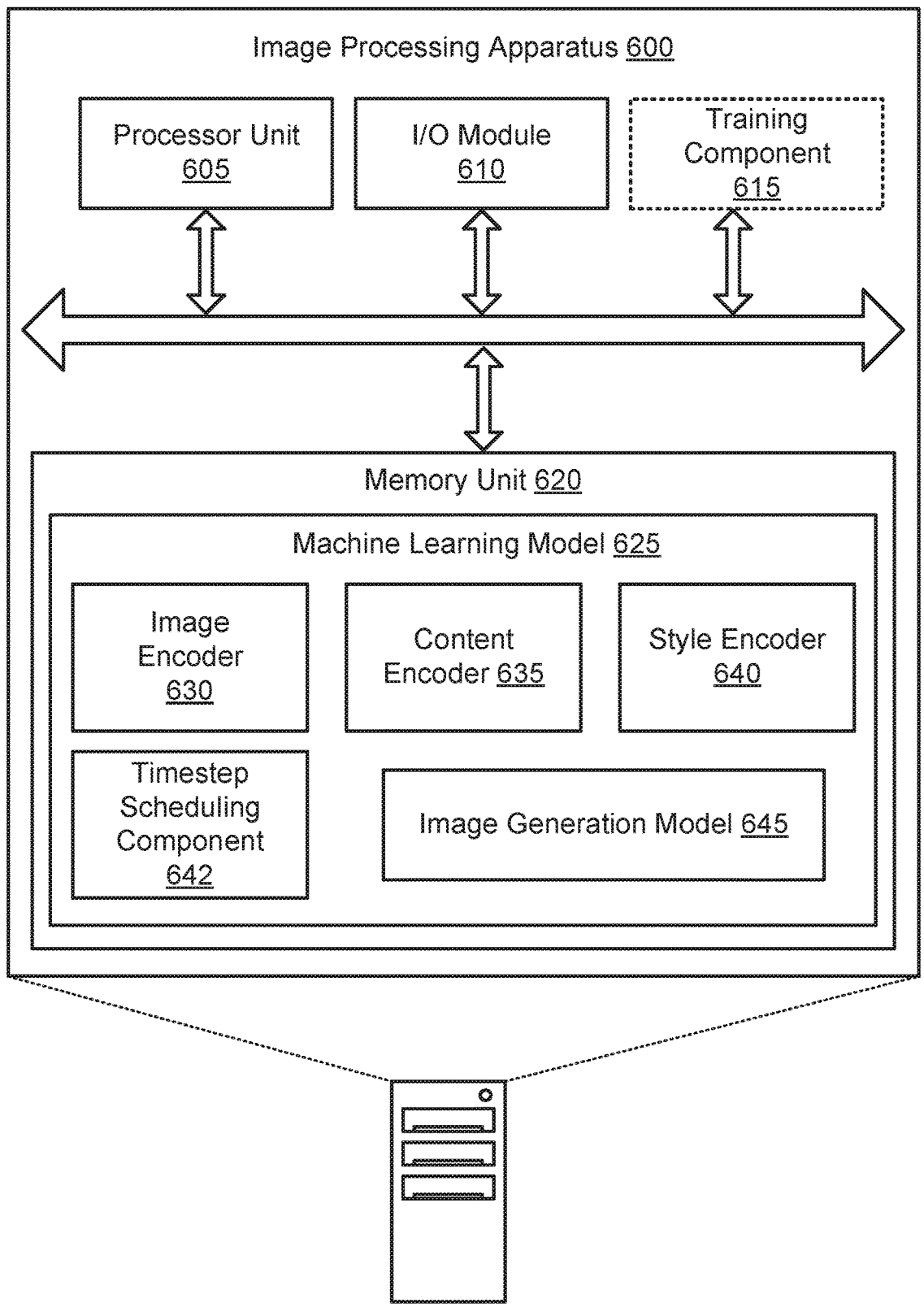
FIG. 6 shows an example of an image processing apparatus according to aspects of the present disclosure.

FIG. 6 shows an example of an image processing apparatus 600 according to aspects of the present disclosure. The example shown includes image processing apparatus 600, processor unit 605, I/O module 610, training component 615, and memory unit 620. Image processing apparatus 600 is an example of, or includes aspects of, the corresponding element described with reference to FIG. 1. In one embodiment, machine learning model 625 includes image encoder 630, content encoder 635, style encoder 640, timestep scheduling component 642, and image generation model 645.

Processor unit 605 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 605 is configured to operate a memory array using a memory controller. In other cases, a memory controller is integrated into the processor. In some cases, processor unit 605 is configured to execute computer-readable instructions stored in a memory to perform various functions. In some embodiments, processor unit 605 includes special purpose components for modem processing, baseband processing, digital signal processing, or transmission processing.

Examples of memory unit 620 include random access memory (RAM), read-only memory (ROM), or a hard disk. Examples of memory unit 620 include solid state memory and a hard disk drive. In some examples, memory unit 620 is used to store computer-readable, computer-executable software including instructions that, when executed, cause a processor to perform various functions described herein. In some cases, memory unit 620 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 620 store information in the form of a logical state.

In some examples, at least one memory unit 620 includes instructions executable by the at least one processor unit 605. Memory unit 620 includes machine learning model 625 or stores parameters of machine learning model 625.

I/O module 610 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 610 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 600 includes a computer implemented artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 600 includes a convolutional neural network (CNN) for image processing (e.g., image encoding, image decoding). CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 615 initializes a content encoder 635, a style encoder 640, and an image generation model 645. In some examples, training component 615 receives training data including an image containing spatial content and a style attribute. In some examples, training component 615 computes an objective function based on the training data. In some examples, training component 615 trains the content encoder 635, the style encoder 640, and the image generation model 645 based on the objective function. In some examples, training component 615 generates a noisy latent code based on the latent code using a forward diffusion process. In some cases, training component 615 is implemented on an apparatus other than image processing apparatus 600.

According to some embodiments, machine learning model 625 obtains a content input and a style input, where the content input includes a target spatial layout and the style input includes a target style. In some examples, the content input includes a content image and the style input includes a style image. In some examples, machine learning model 625 performs a spatial-wise operation based on the spatial layout mask, where the image is generated based on the spatial-wise operation. In some examples, machine learning model 625 performs a channel-wise operation based on the style embedding, where the image is generated based on the channel-wise operation. In some examples, machine learning model 625 generates a noise vector, where the image is generated based on the noise vector using a reverse diffusion process. Machine learning model 625 is an example of, or includes aspects of, the corresponding element described with reference to FIG. 9.

According to some embodiments, timestep scheduling component 642 computes a content weight based on a diffusion timestep, where the image is generated based on the spatial layout mask according to the content weight. In some examples, timestep scheduling component 642 computes a style weight based on a diffusion timestep, where the image is generated based on the style embedding according to the style weight. Timestep scheduling component 642 is an example of, or includes aspects of, the corresponding element described with reference to FIG. 12.

According to some embodiments, image encoder 630 generates a latent code based on the image. Image encoder 630 is an example of, or includes aspects of, the corresponding element described with reference to FIGS. 7 and 9.

According to some embodiments, content encoder 635 encodes, the content input to obtain a spatial layout mask representing the target spatial layout. In some examples, the spatial layout mask includes a set of values corresponding to a set of locations of the content input, respectively, and where the style embedding includes a tuple of values that together represent the target style.

In some examples, content encoder 635 is trained to generate a spatial layout mask representing a target spatial layout. In some examples, content encoder 635 generates a predicted spatial layout mask.

According to some embodiments, content encoder 635 includes parameters stored in the at least one memory unit 620 and is trained to encode a content input to obtain a spatial layout mask representing a target spatial layout. In some examples, content encoder 635 includes a residual neural network. Content encoder 635 is an example of, or includes aspects of, the corresponding element described with reference to FIG. 9.

According to some embodiments, style encoder 640 encodes the style input to obtain a style embedding representing the target style. In some examples, the style embedding includes global semantic information representing the target style.

In some examples, the style encoder 640 is trained to generate a style embedding representing a target style. In some examples, style encoder 640 generates a predicted style embedding using the style encoder 640, where the predicted image is generated based on the predicted spatial layout mask and the predicted style embedding.

According to some embodiments, style encoder 640 includes parameters stored in the at least one memory unit 620 and is trained to encode a style input to obtain a style embedding representing a target style. In some examples, style encoder 640 includes a residual neural network. Style encoder 640 is an example of, or includes aspects of, the corresponding element described with reference to FIG. 9.

According to some embodiments, image generation model 645 generates an image based on the spatial layout mask and the style embedding, where the image includes the target spatial layout and the target style.

In some embodiments, image generation model 645 is trained to generate a predicted image including a target spatial layout and a target style based on an output of content encoder 635 and an output of style encoder 640. In some examples, image generation model 645 generates a predicted image, where the objective function is computed based on the predicted image.

According to some embodiments, image generation model 645 includes parameters stored in the at least one memory unit 620 and is trained to generate an image based on the spatial layout mask and the style embedding, wherein the image includes the target spatial layout and the target style. In some examples, image generation model 645 includes a denoising unit. Image generation model 645 is an example of, or includes aspects of, the corresponding element described with reference to FIG. 9.

Diffusion models are one class of generative models that map the complex real distribution to the simple known distribution. In some embodiments, diffusion models are configured to train the networks that learn to denoise a given noised image and a timestep t. The noised image is obtained by a fixed noising schedule. Diffusion models are formulated as $p_\theta(x_0)$. The marginal $p_\theta(x_0)$ can be formulated as a marginalization of the joint $p_\theta(x_{0:T})$ over the variables $x_{1:T}$, where $x_1, \ldots, x_T$ are latent variables, and $p(x_T)$ is defined as standard gaussian. Variational bound of negative log likelihood of $p_\theta(x_0)$ is computed by introducing the posterior distribution $q(x_{1:T}|x_0)$ with the joint $p_\theta(x_{0:T})$. In diffusion models, the forward process $q(x_{1:T}|x_0)$ is a pre-defined Markov Chain involving gradual addition of noise sampled from standard Gaussian to an image. Hence, the forward process can be thought of as a fixed noise scheduler with the t-th factorized component $q(x_t|x_{t-1})$ represented as: $q(x_t|x_{t-1})=N(x_t; \sqrt{1-\beta_t}x_{t-1},\beta_t I)$, where $\beta_t$ is defined manually. On the other hand, the reverse or the generative process $p_\theta(x_{0:T})$ is modeled as a denoising neural network trained to remove noise gradually at each step. The t-th factorized component $p_\theta(x_{t-1}|x_t)$ of the reverse process is then defined as, $N(x_{t-1}|\mu_\theta(x_t, t), \Sigma(x_t, t))$. Assuming that variance is fixed, the objective of diffusion models (estimating y and E) can be derived using the variational bound.

Following denoising diffusion probabilistic models (DDPM), denoising diffusion implicit model (DDIM) reduces the sampling time by deriving a non-Markovian diffusion process that generalizes DDPM. The latent space of DDPM and DDIM has the same capacity as the original image making it computationally expensive and memory intensive. Latent diffusion models (LDM) use a pre-trained autoencoder to reduce the dimension of images to a lower capacity space and trained a diffusion model on the latent space of the autoencoder, reducing time and memory complexity without loss in quality. In some example experiments, image generation model 645 is based on LDM as the base diffusion model with DDIM for sampling.

Figure 7:
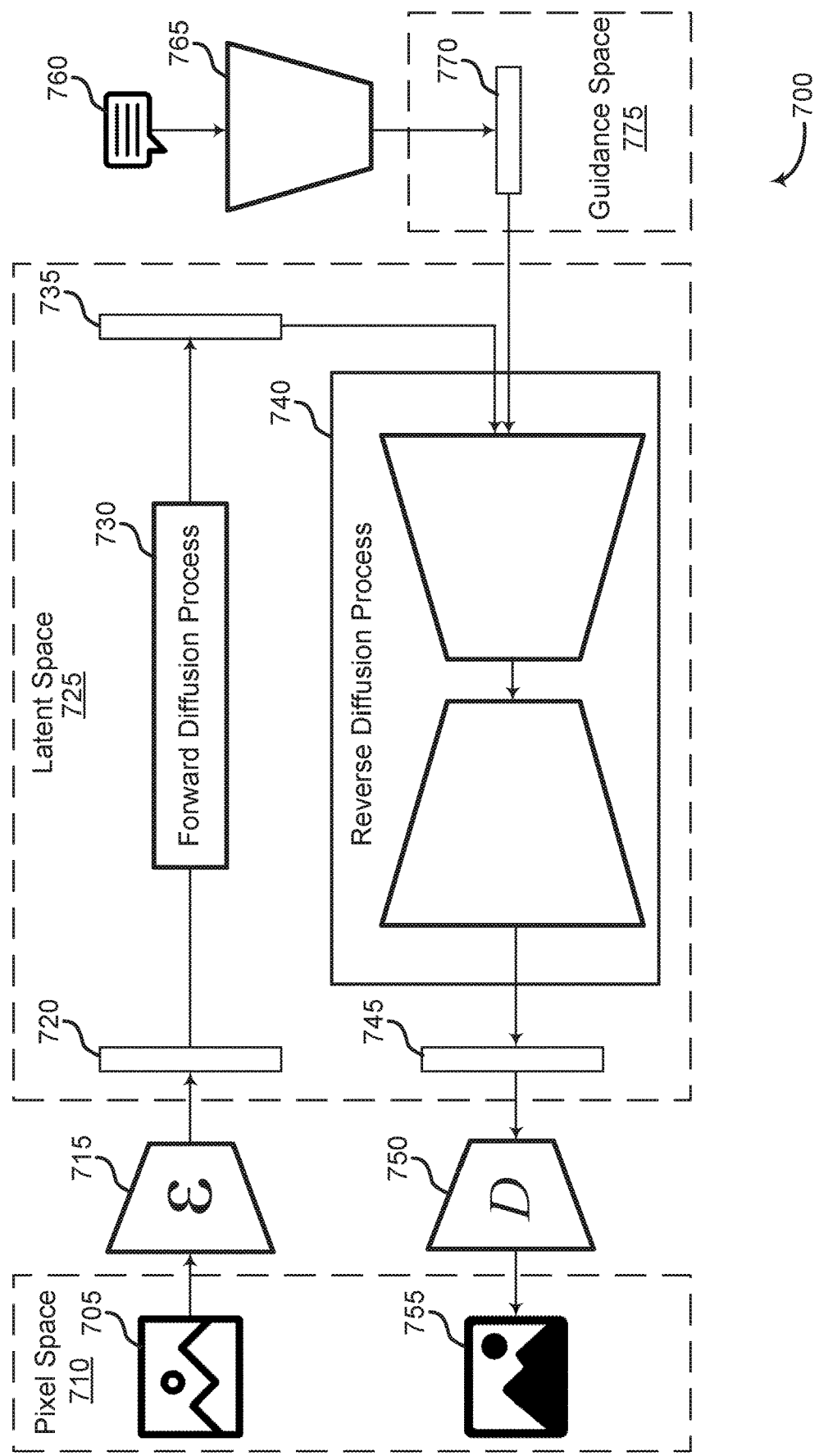
FIG. 7 shows an example of a latent diffusion model according to aspects of the present disclosure.

FIG. 7 shows an example of a latent diffusion model according to aspects of the present disclosure. The example shown includes guided latent diffusion model 700, original image 705, pixel space 710, image encoder 715, original image features 720, latent space 725, forward diffusion process 730, noisy features 735, reverse diffusion process 740, denoised image features 745, image decoder 750, output image 755, text prompt 760, text encoder 765, guidance features 770, and guidance space 775. FIG. 7 shows an example of a guided latent diffusion model 700. The guided latent diffusion model 700 is an example of, or includes aspects of, the corresponding element described with reference to FIG. 6 (i.e., image generation model 645).

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided latent diffusion model 700 may take an original image 705 in a pixel space 710 as input and apply an image encoder 715 to convert original image 705 into original image features 720 in a latent space 725. Then, a forward diffusion process 730 gradually adds noise to the original image features 720 to obtain noisy features 735 (also in latent space 725) at various noise levels.

Next, a reverse diffusion process 740 (e.g., a U-Net ANN) gradually removes the noise from the noisy features 735 at the various noise levels to obtain denoised image features 745 in latent space 725. In some examples, the denoised image features 745 are compared to the original image features 720 at each of the various noise levels, and parameters of the reverse diffusion process 740 of the diffusion model are updated based on the comparison. Finally, an image decoder 750 decodes the denoised image features 745 to obtain an output image 755 in pixel space 710. In some cases, an output image 755 is created at each of the various noise levels. The output image 755 can be compared to the original image 705 to train the reverse diffusion process 740.

In some cases, image encoder 715 and image decoder 750 are pre-trained prior to training the reverse diffusion process 740. In some examples, they are trained jointly, or the image encoder 715 and image decoder 750 and fine-tuned jointly with the reverse diffusion process 740.

The reverse diffusion process 740 can also be guided based on a text prompt 760, or another guidance prompt, such as an image, a layout, a segmentation map, etc. The text prompt 760 can be encoded using a text encoder 765 (e.g., a multimodal encoder) to obtain guidance features 770 in guidance space 775. The guidance features 770 can be combined with the noisy features 735 at one or more layers of the reverse diffusion process 740 to ensure that the output image 755 includes content described by the text prompt 760. For example, guidance features 770 can be combined with the noisy features 735 using a cross-attention block within the reverse diffusion process 740.

Original image 705 is an example of, or includes aspects of, the corresponding element described with reference to FIG. 10. Image encoder 715 is an example of, or includes aspects of, the corresponding element described with reference to FIGS. 6 and 9.

Forward diffusion process 730 is an example of, or includes aspects of, the corresponding element described with reference to FIG. 10. Reverse diffusion process 740 is an example of, or includes aspects of, the corresponding element described with reference to FIG. 10. Output image 755 is an example of, or includes aspects of, the corresponding element described with reference to FIG. 12.

Figure 8:
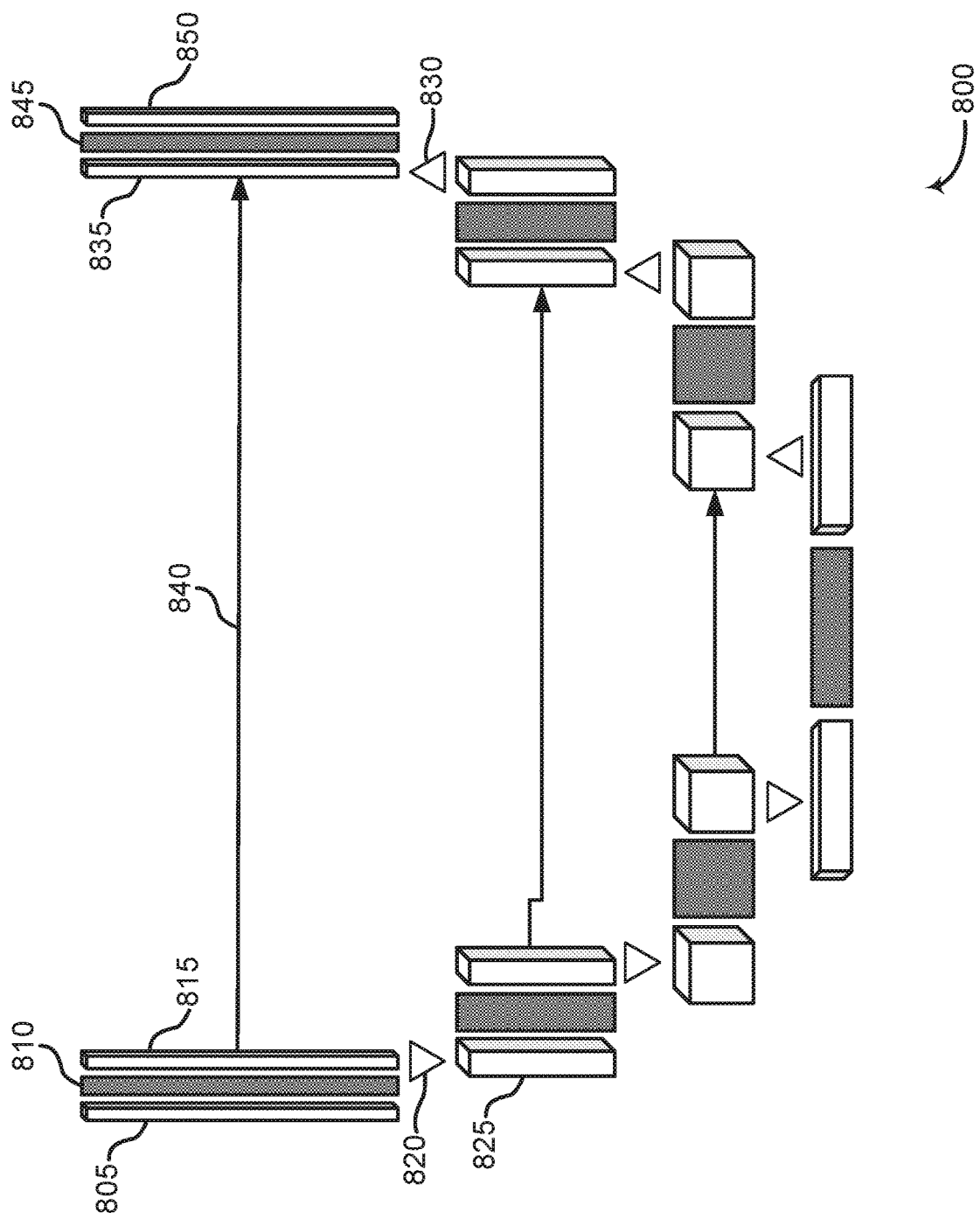
FIG. 8 shows an example of U-Net architecture according to aspects of the present disclosure.

FIG. 8 shows an example of U-Net 800 architecture according to aspects of the present disclosure. The example shown includes U-Net 800, input features 805, initial neural network layer 810, intermediate features 815, down-sampling layer 820, down-sampled features 825, up-sampling process 830, up-sampled features 835, skip connection 840, final neural network layer 845, and output features 850. The U-Net 800 is an example of, or includes aspects of, the architecture used within the reverse diffusion process described with reference to FIG. 9.

In some examples, diffusion models are based on a neural network architecture known as a U-Net. The U-Net 800 takes input features 805 having an initial resolution and an initial number of channels, and processes the input features 805 using an initial neural network layer 810 (e.g., a convolutional network layer) to produce intermediate features 815. The intermediate features 815 are then down-sampled using a down-sampling layer 820 such that down-sampled features 825 features have a resolution less than the initial resolution and a number of channels greater than the initial number of channels.

This process is repeated multiple times, and then the process is reversed. That is, the down-sampled features 825 are up-sampled using up-sampling process 830 to obtain up-sampled features 835. The up-sampled features 835 can be combined with intermediate features 815 having a same resolution and number of channels via a skip connection 840. These inputs are processed using a final neural network layer 845 to produce output features 850. In some cases, the output features 850 have the same resolution as the initial resolution and the same number of channels as the initial number of channels.

In some cases, U-Net 800 takes additional input features to produce conditionally generated output. For example, the additional input features could include a vector representation of an input prompt. The additional input features can be combined with the intermediate features 815 within the neural network at one or more layers. For example, a cross-attention module can be used to combine the additional input features and the intermediate features 815.

Figure 9:
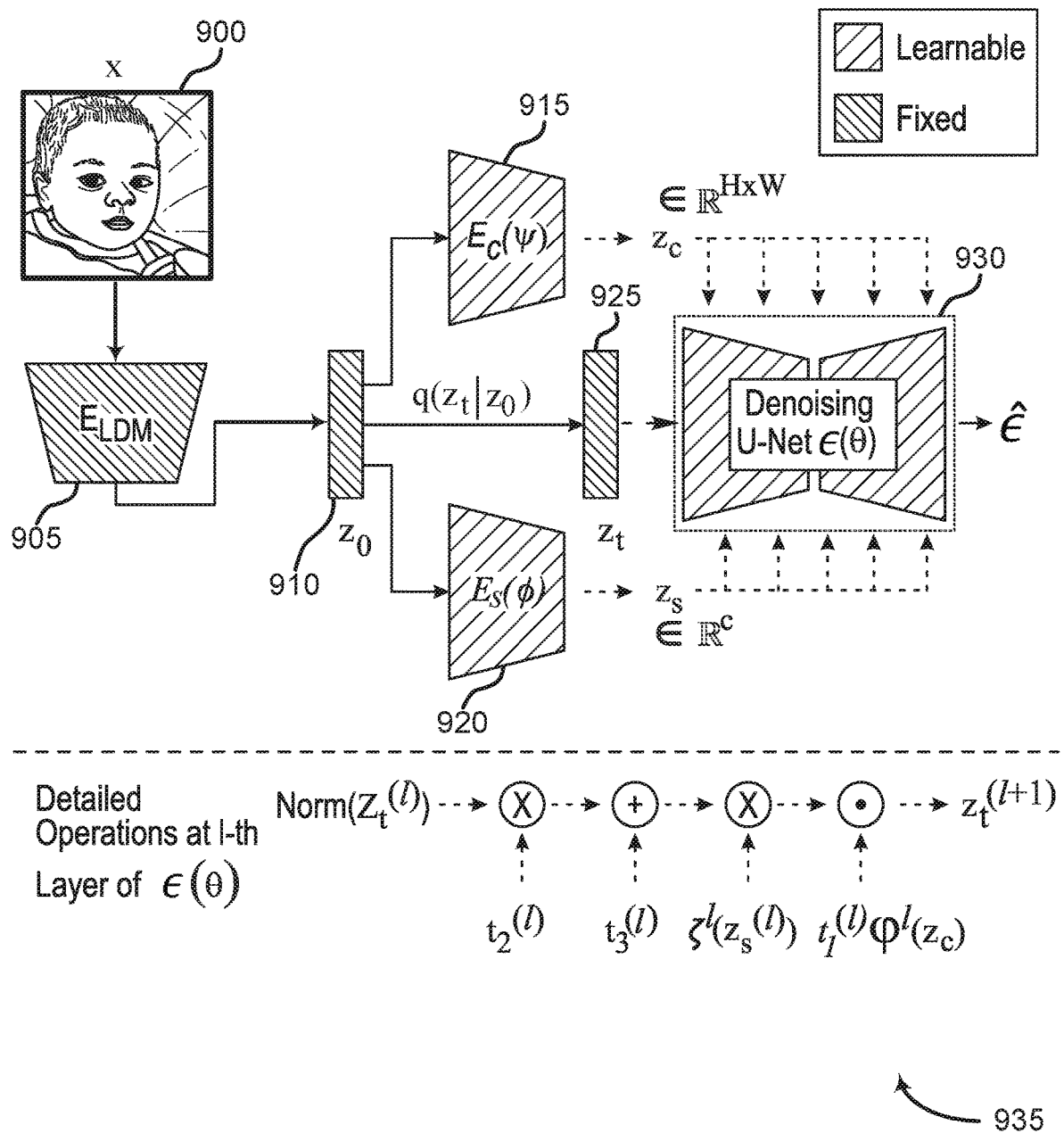
FIG. 9 shows an example of a machine learning model according to aspects of the present disclosure.

FIG. 9 shows an example of a machine learning model 935 according to aspects of the present disclosure. The example shown includes image 900, image encoder 905, latent code 910, content encoder 915, style encoder 920, forward process output 925, image generation model 930, and machine learning model 935.

In one or more embodiments of the present disclosure, the diffusion model is based on latent diffusion model (LDM), which is faster to train and sample from than pixel-based diffusion models. Let x be an input image and $E_{LDM}$ and $D_{LDM}$ be the pre-trained and fixed encoder and decoder, respectively. In some examples, training data includes image x comprising spatial content and a style attribute. In some cases, $E_{LDM}$ is also referred to as image encoder 905. The actual input space for the diffusion model is the low-dimensional latent space $z=E_{LDM}(x)$. The output of the reverse diffusion process is the low-dimensional latent $\hat{z}_0$. The output low-dimensional latent code $\hat{z}_0$ is input to the pre-trained decoder $D_{LDM}$ to obtain the final output image $\hat{x}_0 = D_{LDM}(\hat{z}_0)$.

One or more embodiments of the present disclosure learn content latent space and style latent space. Image generation model 930 (e.g., a diffusion model) is trained together with a content encoder $E_c(\cdot; \psi)$ and a style encoder $E_s(\cdot; \phi)$. The objective for jointly training content encoder 915, style encoder 920 and image generation model 930 using an end-to-end process is further described in FIG. 14. In some examples, $E_c(\cdot; \psi)$ and $E_s(\cdot; \phi)$ refer to content encoder 915 and style encoder 920, respectively. In some examples, $z_0$ and $z_t$ are referred to as latent code 910 and forward process output 925, respectively.

In some embodiments, the shapes of $z_s$ and $z_c$ are configured to be asymmetrical, this way the content and style encoders can capture different semantic aspects of an image (e.g., a training image or a reference image). The content encoder $E_c(z_0; \psi)$ outputs a spatial layout mask (e.g., a content code)

$$z_c \in R^{1 \times \frac{h}{4} \times \frac{w}{4}}$$

where w and h are the width and height of $z_0$ latent code, respectively. The style encoder $E_s(z_0; \phi)$ outputs style code $z_s \in R^{512 \times 1 \times 1}$ after global average pool layer to capture global high-level semantics.

In some embodiments, image generation model 930 includes a denoising U-Net. At one or more layers of the denoising UNet $\epsilon(\cdot; \theta)$, the style code $z_s$ is applied using channel-wise affine transformation, and the content code $z_c$ is applied using spatial-wise affine transformation. The style code $z_s$ and the content code $z_c$ are applied using timestep information ($t_1$, $t_2$, and $t_3$). The interaction of style code $z_s$ and content code $z_c$ is formulated as follows:

$$\underbrace{t_1(1 + \varphi^l(z_c))}_{spatial-wise} \odot \underbrace{[(1 + \zeta^l(z_s)) \cdot (t_2(h^l + t_3))]}_{channel-wise} \quad (1)$$

where $\varphi^l$ is a downsampling or upsampling operation at l-th layer to make the dimensions of $\varphi^l(z_c)$ and $h^l$ match, and $\zeta^l$ is a multi-layer perceptron (MLP) layer to optimize $z_s$ for l-th layer. $h^l$ denotes the group-normalized feature map at l-th layer from the denoising networks $\epsilon(\cdot; \theta)$. $t_1$, $t_2$, and $t_3$ are timestep information derived from the output of the MLP(enc(t)) after a sinusoidal embedding layer. Group normalization is used.

In some embodiments, for FFHQ and LSUN-church, machine learning model 935 is trained for two days with eight V-100 GPUs. The machine learning model 935 for AFHQ dataset is trained for one and a half days with the same device. The models are trained for approximately 200000 iterations with a batch size of 32, 4 samples per GPU without gradient accumulation. The models are trained with 256×256 images with a latent z size of 3×64×64. The dimensions of content code $z_c$ is 1×8×8 while that of style code $z_s$ is 512×1×1.

$t_1$, $t_2$ and $t_3$ are timestep embeddings learned to specialize according to the latent code they are applied for to support learning different behavior for content and style features at different timesteps. Some embodiments experimented with different sizes for content and style code. The content encoder 915 takes as input z and outputs $z_c$ following a sequence of ResNet blocks. The style encoder 920 has a similar sequence of ResNet blocks followed by a final global average pooling layer to squish the spatial dimensions similar to the semantic encoder.

During sampling, without reverse DDIM, if all the joint, conditionals, and unconditional guidance are used, sampling time for a single image is 10 seconds. With reverse DDIM to get $x_T$ where T is the final timestep, it takes 22 seconds.

Image encoder 905 is an example of, or includes aspects of, the corresponding element described with reference to FIGS. 6 and 7. Content encoder 915 is an example of, or includes aspects of, the corresponding element described with reference to FIG. 6. Style encoder 920 is an example of, or includes aspects of, the corresponding element described with reference to FIG. 6.

Image generation model 930 is an example of, or includes aspects of, the corresponding element described with reference to FIG. 6. Machine learning model 935 is an example of, or includes aspects of, the corresponding element described with reference to FIG. 6.

Figure 10:
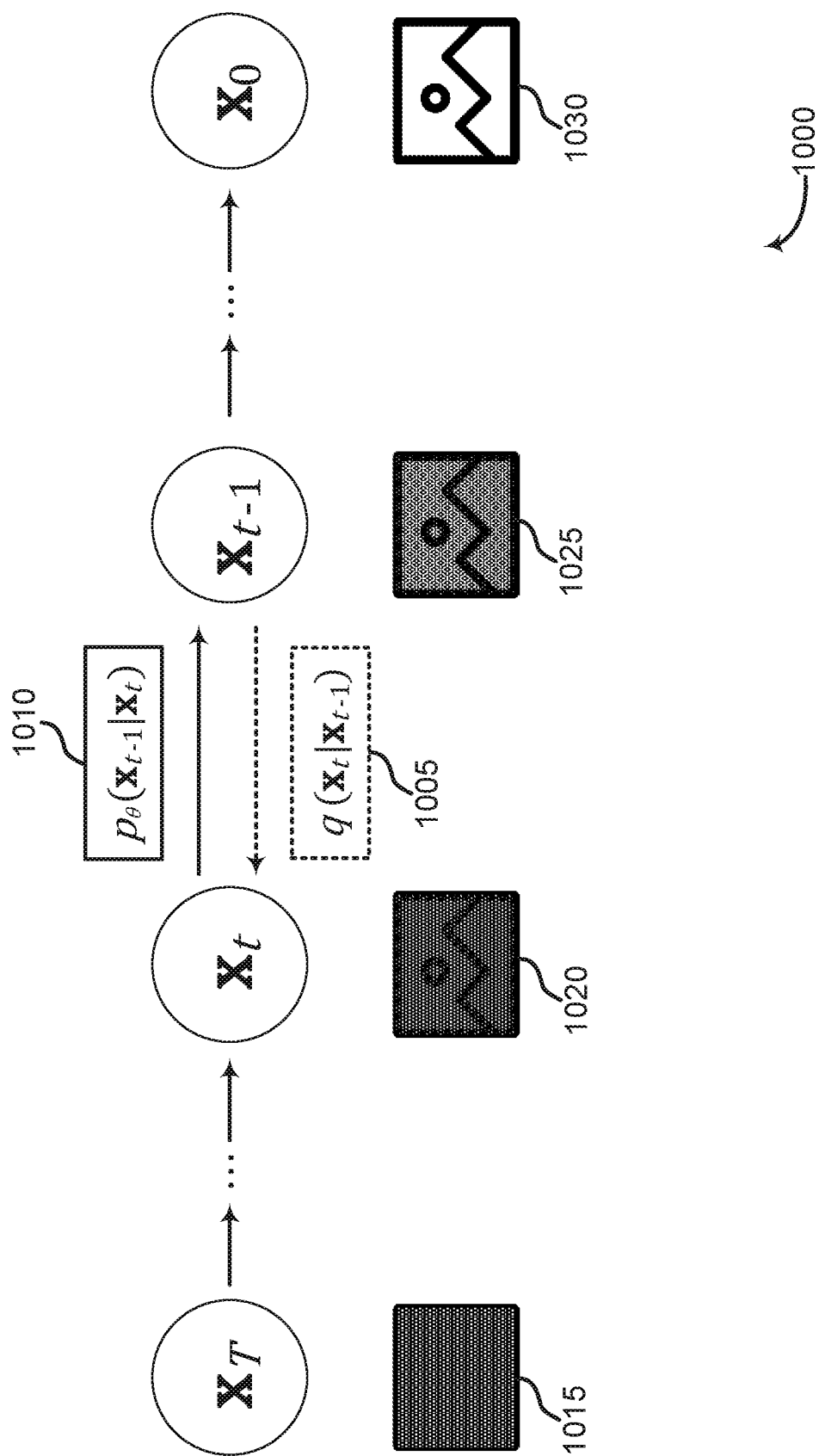
FIG. 10 shows an example of reverse diffusion process according to aspects of the present disclosure.

FIG. 10 shows an example of reverse diffusion process 1010 according to aspects of the present disclosure. The example shown includes diffusion process 1000, forward diffusion process 1005, reverse diffusion process 1010, noisy image 1015, first intermediate image 1020, second intermediate image 1025, and original image 1030. FIG. 10 shows a diffusion process 1000. As described above with reference to FIG. 7, a diffusion model can include both a forward diffusion process 1005 for adding noise to an image (or features in a latent space) and a reverse diffusion process 1010 for denoising the images (or features) to obtain a denoised image. The forward diffusion process 1005 can be represented as $q(x_t|x_{t-1})$, and the reverse diffusion process 1010 can be represented as $p(x_{t-1}|x_t)$. In some cases, the forward diffusion process 1005 is used during training to generate images with successively greater noise, and a neural network is trained to perform the reverse diffusion process 1010 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 1010, the model begins with noisy data $x_T$, such as a noisy image 1015 and denoises the data to obtain the $p(x_{t-1}|x_t)$. At each step t−1, the reverse diffusion process 1010 takes $x_t$, such as first intermediate image 1020, and t as input. Here, t represents a step in the sequence of transitions associated with different noise levels, The reverse diffusion process 1010 outputs $x_{t-1}$, such as second intermediate image 1025 iteratively until $x_T$ is reverted back to $x_0$, the original image 1030. The reverse process can be represented as:

$$p_\theta(x_{t-1}|x_t) := N\left(x_{t-1}; \mu_\theta(x_t, t), \sum_\theta (x_t, t)\right). \quad (2)$$

The joint probability of a sequence of samples in the Markov chain can be written as a product of conditionals and the marginal probability:

$$x_T: \; p_\theta(x_{\theta:T}) := p(x_T) \prod_{t=1}^{T} p_\theta(x_{t-1}|x_t), \quad (3)$$

where $p(x_T) = N(x_T; 0, I)$ is the pure noise distribution as the reverse process takes the outcome of the forward process, a sample of pure noise, as input and $\prod_{t=1}^{T} p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input, and a generated data x is mapped back into the pixel space from the latent space as output. In some examples, $x_0$ represents an original input image with low image quality, latent variables $x_1, \ldots, x_T$ represent noisy images, and x represents the generated image with high image quality.

Forward diffusion process 1005 is an example of, or includes aspects of, the corresponding element described with reference to FIG. 7. Reverse diffusion process 1010 is an example of, or includes aspects of, the corresponding element described with reference to FIG. 7. Original image 1030 is an example of, or includes aspects of, the corresponding element described with reference to FIG. 7.

Figure 11:
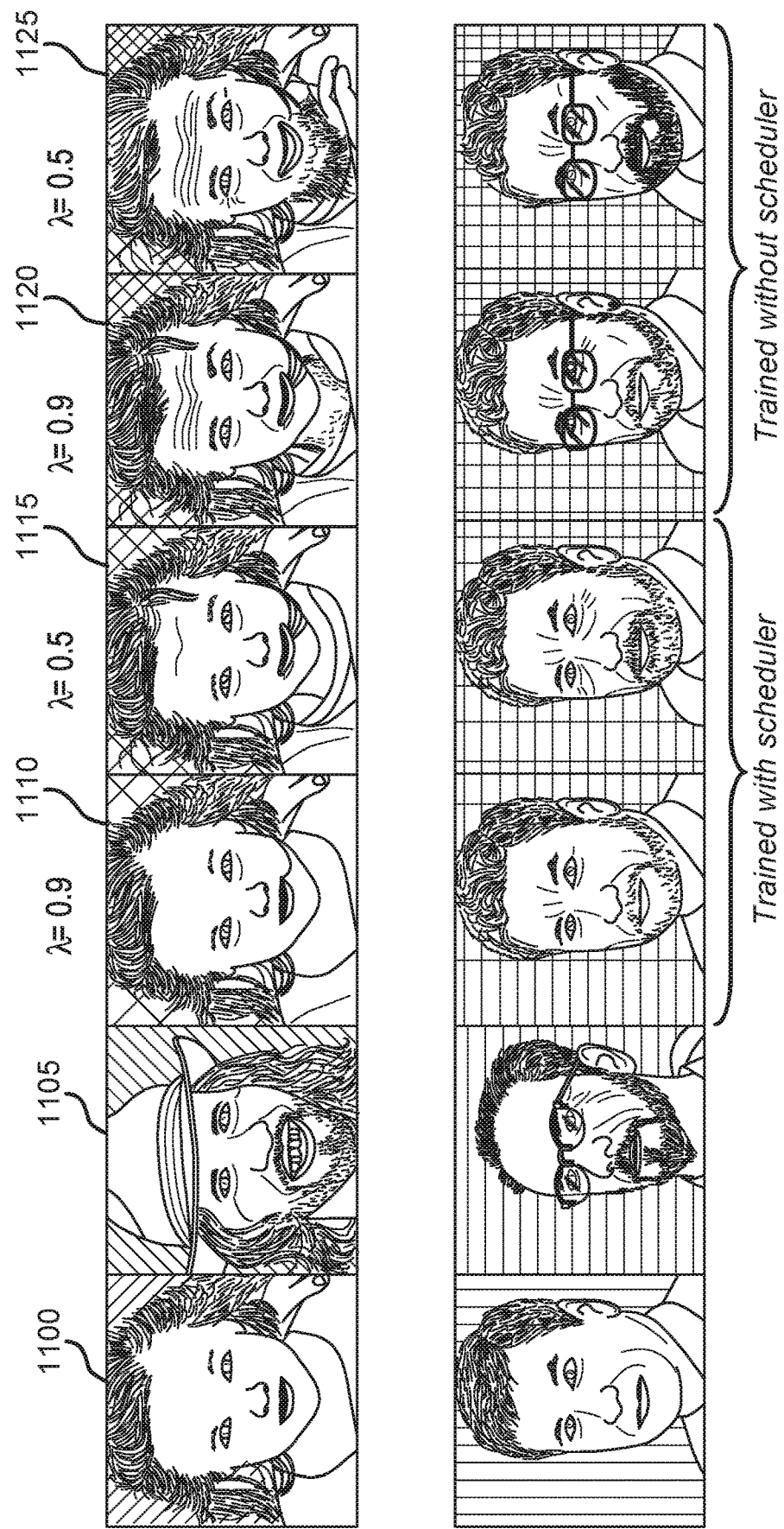
FIG. 11 shows an example of timestep scheduling according to aspects of the present disclosure.

FIG. 11 shows an example of timestep scheduling according to aspects of the present disclosure. The example shown includes content image 1100, style image 1105, first output image 1110, second output image 1115, third output image 1120, and fourth output image 1125.

In some embodiments, timestep scheduling is applied exclusively during sampling. In some models, a machine learning model is trained with timestep scheduling applied during training to analyze how it affects the behavior of the machine learning model. FIG. 11 shows the comparisons between the models trained with the timestep scheduler and without the timestep scheduler. For the results trained with scheduler, some examples used $\alpha=0.1$ and $b=529(SNR^{-1}(0.1))$ for both training and sampling. As seen in the rightmost two columns, the style effects are relatively small although given $\lambda$ is controlled. It is because the style encoder is trained to be injected exclusively in the early timesteps (0-528), which makes the style representations learn limited features (e.g., eyeglasses are not encoded in the style, as shown in the second row). However, some examples show better decomposition between factors controlled by content and style compared to using the timestep scheduling during sampling. This is because, using timestep scheduling to vary the conditioning input at each timestep implicitly trains the model to specialize to the varied conditioning, implicitly learning a mixture-of-experts like model.

Content image 1100 is an example of, or includes aspects of, the corresponding element described with reference to FIGS. 3, 4, and 12. Style image 1105 is an example of, or includes aspects of, the corresponding element described with reference to FIGS. 3, 4, and 12.

First output image 1110 is an example of, or includes aspects of, the corresponding element described with reference to FIGS. 3 and 4. Second output image 1115 is an example of, or includes aspects of, the corresponding element described with reference to FIGS. 3 and 4. Third output image 1120 is an example of, or includes aspects of, the corresponding element described with reference to FIG. 4.

Figure 12:
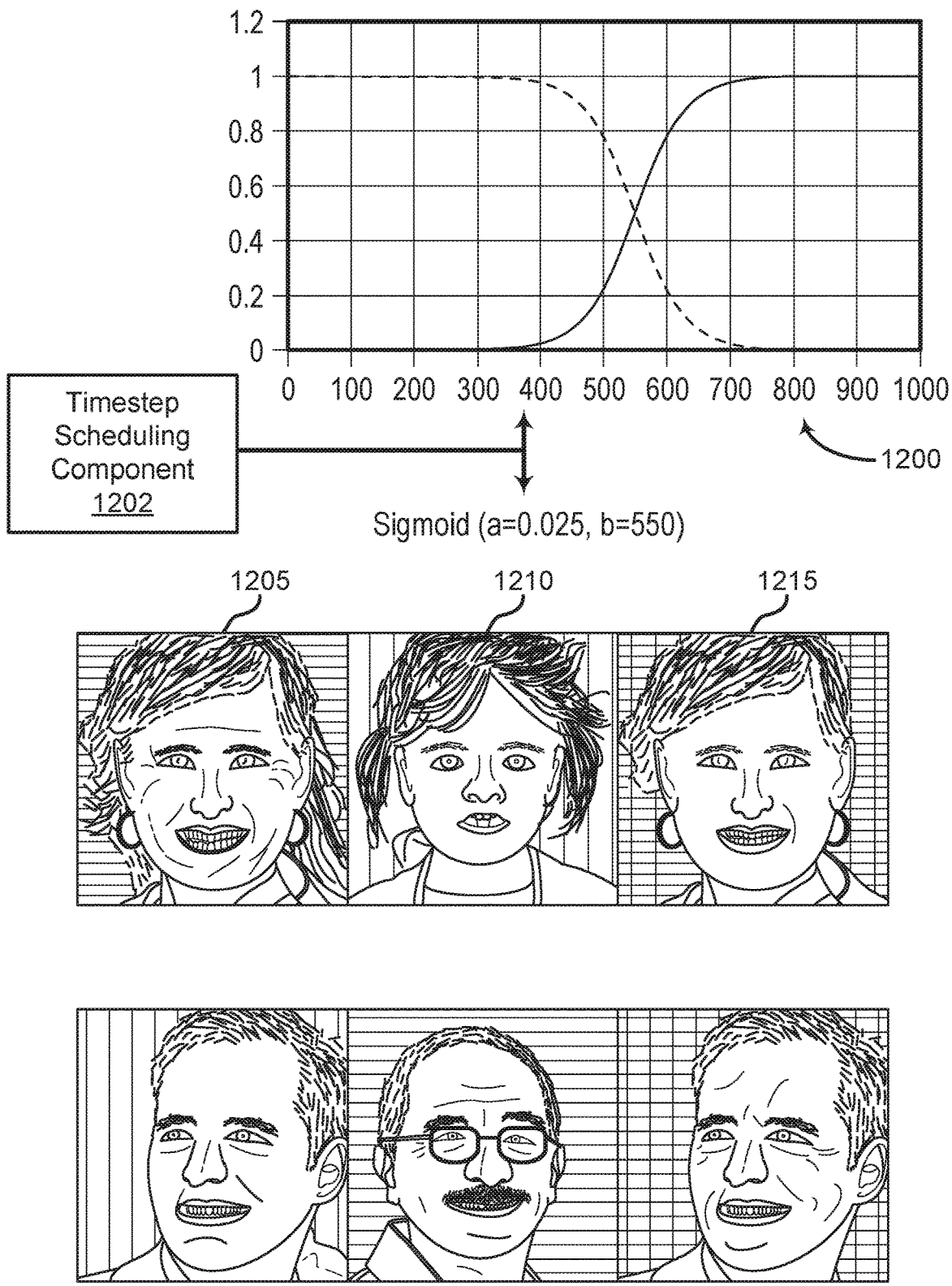
FIG. 12 shows an example of timestep schedule during a sampling process according to aspects of the present disclosure.

FIG. 12 shows an example of timestep schedule during a sampling process according to aspects of the present disclosure. The example shown includes sigmoid scheduler 1200, timestep scheduling component 1202, content image 1205, style image 1210, and output image 1215.

FIG. 12 shows an example of a plot for timestep scheduling. The illustrated plot of sigmoid scheduler 1200 is from $\alpha=0.025$ and $b=550$. Bigger a makes it similar to the exclusive scheduler while smaller $\alpha$ makes it close to the linear scheduler. The dashed line indicates the weight scheduler for the style input and the solid line is for the content input.

According to some embodiments, timestep scheduling component 1202 is configured to compute a content weight based on a diffusion timestep, wherein the image is generated based on the spatial layout mask according to the content weight, and to compute a style weight based on the diffusion timestep, wherein the image is generated based on the style embedding according to the style weight. For example, timestep scheduling component 1202 applies sigmoid scheduler 1200 such that in sigmoid scheduler 1200, $\alpha=0.025$ and $b=550$. Timestep scheduling component 1202 is an example of, or includes aspects of, the corresponding element described with reference to FIG. 6.

The upper portion of FIG. 12 shows timestep scheduled during sampling (i.e., sigmoid scheduler 1200). Sigmoid scheduler 1200, via timestep scheduling component 1202, enables a softer schedule with more controllability, and thus the results are more natural generations compared to the other techniques.

In some examples, different timestep schedulers can be used during sampling. These schedules are not used for training. In the exclusive scheduling, the style weight is one if t≤550 and zero otherwise. The content weight is applied when style weight is not applied. As for linear scheduling, the style weight linearly decreases from 1 at t=0 to 0 at t=999 while the content weight increases linearly from 0 to 1.

The sigmoid scheduling (e.g., sigmoid scheduler 1200) provides a softer weighting scheme leading to better generations and has additional controls to obtain desired results.

One or more embodiments include timestep scheduling for conditioning. In the reverse diffusion process, low-frequency information (i.e., coarse features such as pose and facial shape) is learned in the earlier timesteps (e.g., 0<SNR(t)<$10^{-2}$, SNR(t) stands for signal-noise ratio at a given timestep t), and high-frequency information (e.g., fine-grained features and imperceptible details) is encoded in later timesteps (e.g., 100<SNR(t)<$10^4$) in the reverse diffusion process.

The image processing apparatus includes a weight scheduler for spatial layout mask $z_c$ and style embedding $z_s$. The weight scheduler determines how much the content and the style conditions are applied to the denoising networks. The weight scheduler equations $w_c(t)$ and $w_s(t)$ are formulated as below:

$$w_c(t) = \frac{1}{1 + \exp(-a(t-b))} \quad (4)$$

$$w_s(t) = \frac{1}{1 + \exp(-a(-t+b))} \quad (5)$$

where $\alpha$ is a coefficient for determining how many timesteps content and style are jointly provided, and b indicates the timestep at which $w_s(t) \geq w_c(t)$.

Alternatively, some examples apply simple linear weighting schedule (i.e., decreasing for content and increasing for style with every timestep during the reverse diffusion process) or constant schedule, or other custom weighting schedules. In some cases, the timestep scheduling is applied during training to achieve improved decomposition between factors controlled by content and style.

In some embodiments, generalizing composable diffusion models (CDM) by introducing the joint component improves composition of multiple conditions and increases controllability over image generation. Let $z^*_s$ and $z^*_c$ be the ground-truth content feature and style feature. In some cases, the inductive bias is applied during training to separate the approximate content and the style features $\hat{z}_c$ and $\hat{z}_s$. Using the inductive bias exclusively during sampling represents scaling of the approximate content and the style features $z_c$ and $\hat{z}_s$ due to the variation in the approximate content and the style features' magnitude across timesteps. The approximate $\hat{z}_c$ and $\hat{z}_s$ are used. In some cases, the content and the style guidance from CDM is outside the manifold and may generate unrealistic samples because the combined guidance is outside the manifold. In other cases, the joint guidance is within the manifold and keeps the generation within the manifold.

In some embodiments, the guidance from GCDM is viewed as a linear interpolation between guidance from CDM and the joint guidance and enables separate controls for style, content, and realism. Moreover, CDM and the joint guidance are special cases of GCDM. In some embodiments, a generalized composing method is derived without constraining the style and content to be conditionally independent. In some embodiments, images are sampled given multiple conditions (i.e., style and content), which is formulated as sampling from $\tilde{p}(x_t|c_1, c_2) \propto p(x_t)[p(c_1, c_2|x_t)^\lambda (p(c_1|x_t)^{\beta_2} \cdot p(c_2|x_t)^{\beta_2})^{1+\lambda}]^\alpha$, where $\alpha \geq 0$ controls the overall strength of conditioning, $\lambda \in [0,1]$ controls the trade-off between the dependent and independent conditional information, and $\beta_1$ and $\beta_2$ control the weight for style and content information.

In some examples, the guidance gradient in terms of the denoising network $\epsilon$ (which may depend on zero, one or both conditions) is formulated as follows:

$$\nabla_{x_t} \log \tilde{p}(x_t|c_1, c_2) = \underbrace{\epsilon(x_t, t)}_{\nabla \log p(x_t)} + \qquad (6)$$

$$\alpha \left[ \lambda \underbrace{(\epsilon(x_t, t, c_1, c_2) - \epsilon(x_t, t))}_{\nabla \log p(c_1, c_2|x_t)} + (1 - \lambda) \underbrace{\sum_{i=\{1,2\}} \beta_1 \underbrace{(\epsilon(x_t, t, c_i) - \epsilon(x_t, t))}_{\nabla \log p(c_i|x_t)}}_{\nabla \log p(c_1|x_t)p(c_2|x_t)} \right]$$

If $\lambda=0$, GCDM is reduced to CDM and thus is viewed as a generalization of CDM. $\beta_1$ and $\beta_2$ denote the weight for style information $\beta_s$ and the weight for content information $\beta_c$, respectively. GCDM and timestep scheduling are sampling techniques for diffusion models and are applied to tasks such as image translation.

In some examples, GCDM and CDM for text-to-image generation are implemented using Stable Diffusion. CDM generates unnatural images (e.g., blending two objects) that may be out of the real manifold while GCDM ensures realistic generations (e.g., combining two objects in a realistic way).

Content image 1205 is an example of, or includes aspects of, the corresponding element described with reference to FIGS. 3, 4, and 11. Style image 1210 is an example of, or includes aspects of, the corresponding element described with reference to FIGS. 3, 4, and 11. Output image 1215 is an example of, or includes aspects of, the corresponding element described with reference to FIG. 7.

Training and Evaluation

Figure 13:
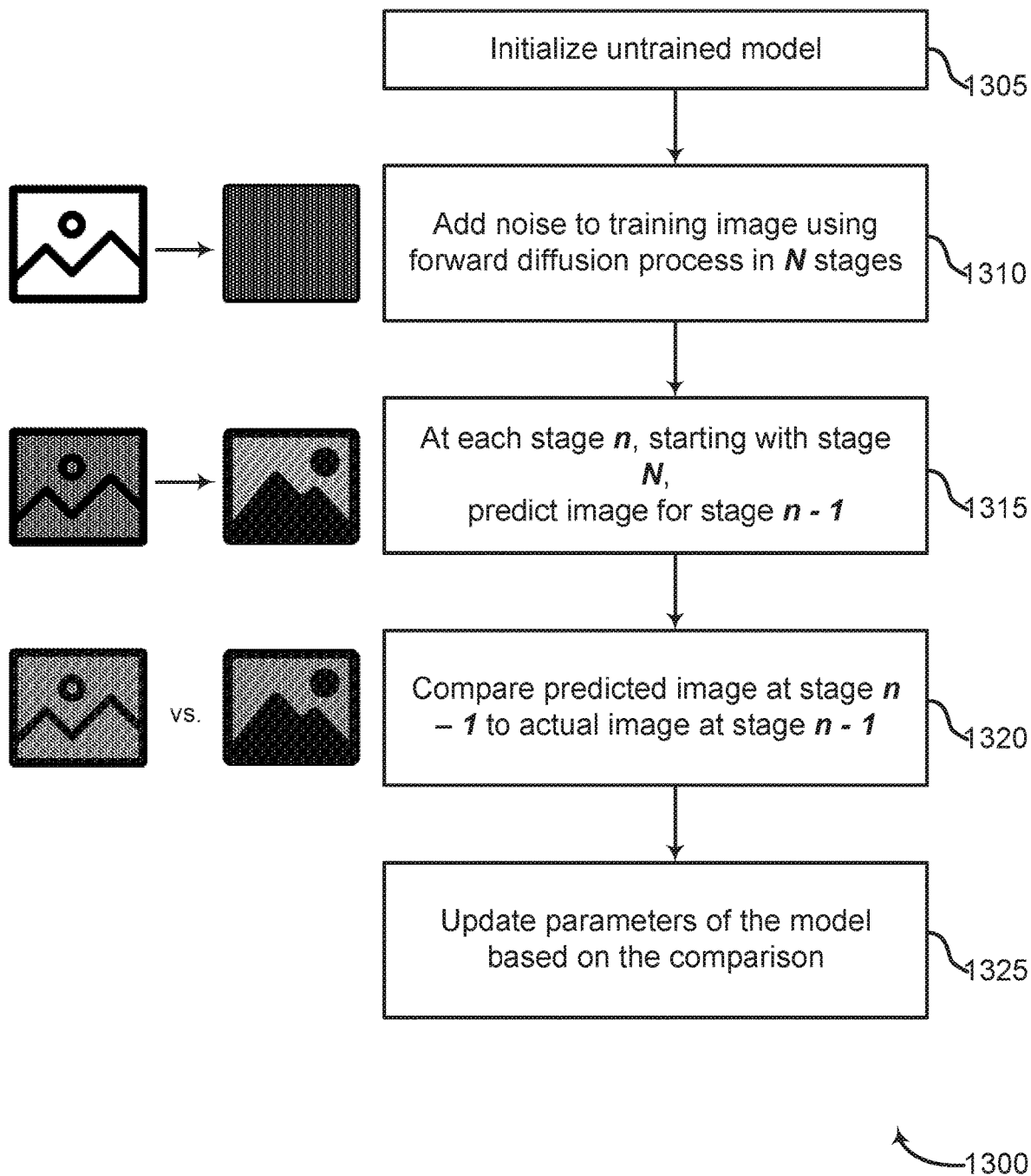
FIG. 13 shows an example of a method of forward and reverse diffusion according to aspects of the present disclosure.
Figure 14:
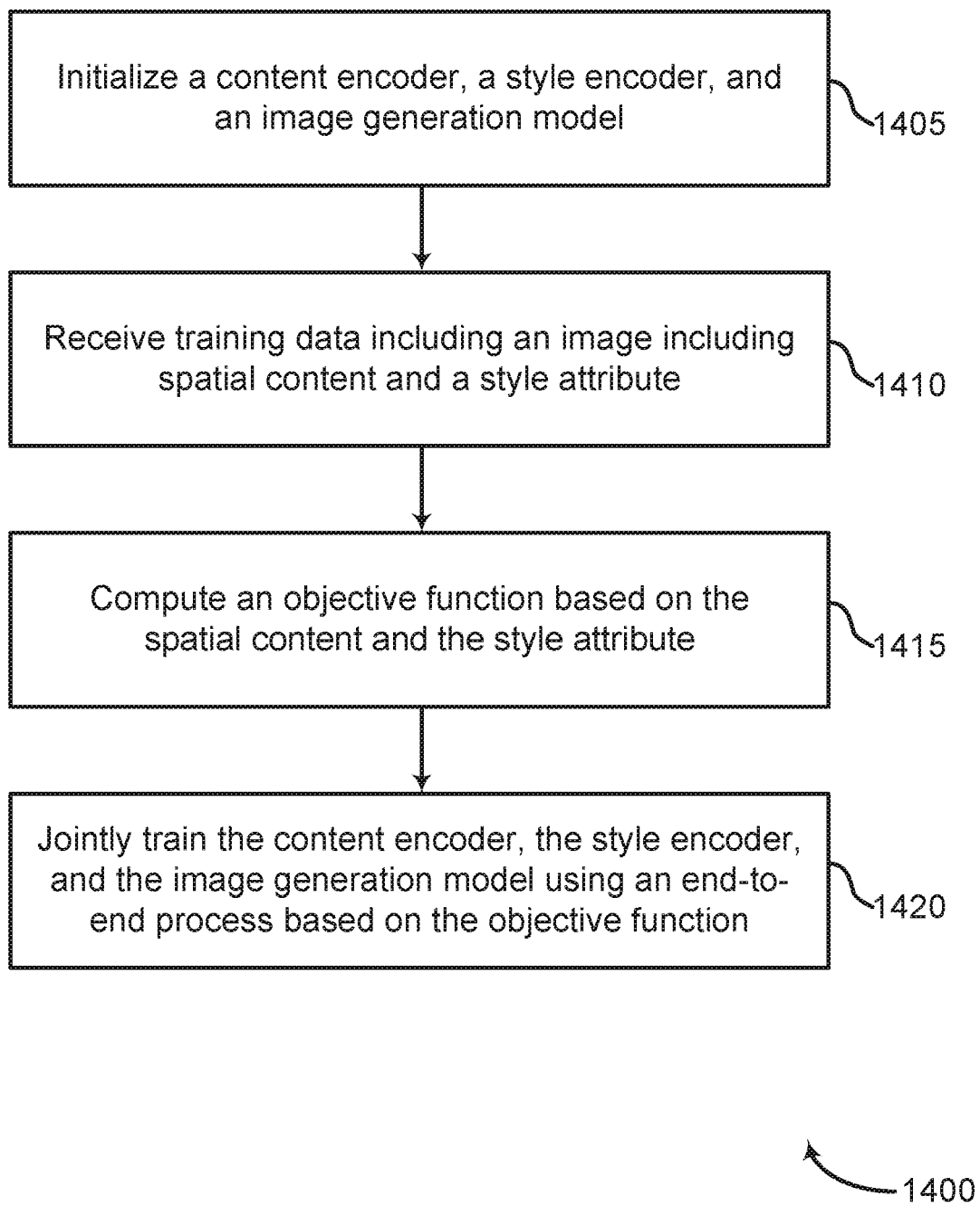
FIG. 14 shows an example of a method for training a machine learning model for image generation according to aspects of the present disclosure.
Figure 15:
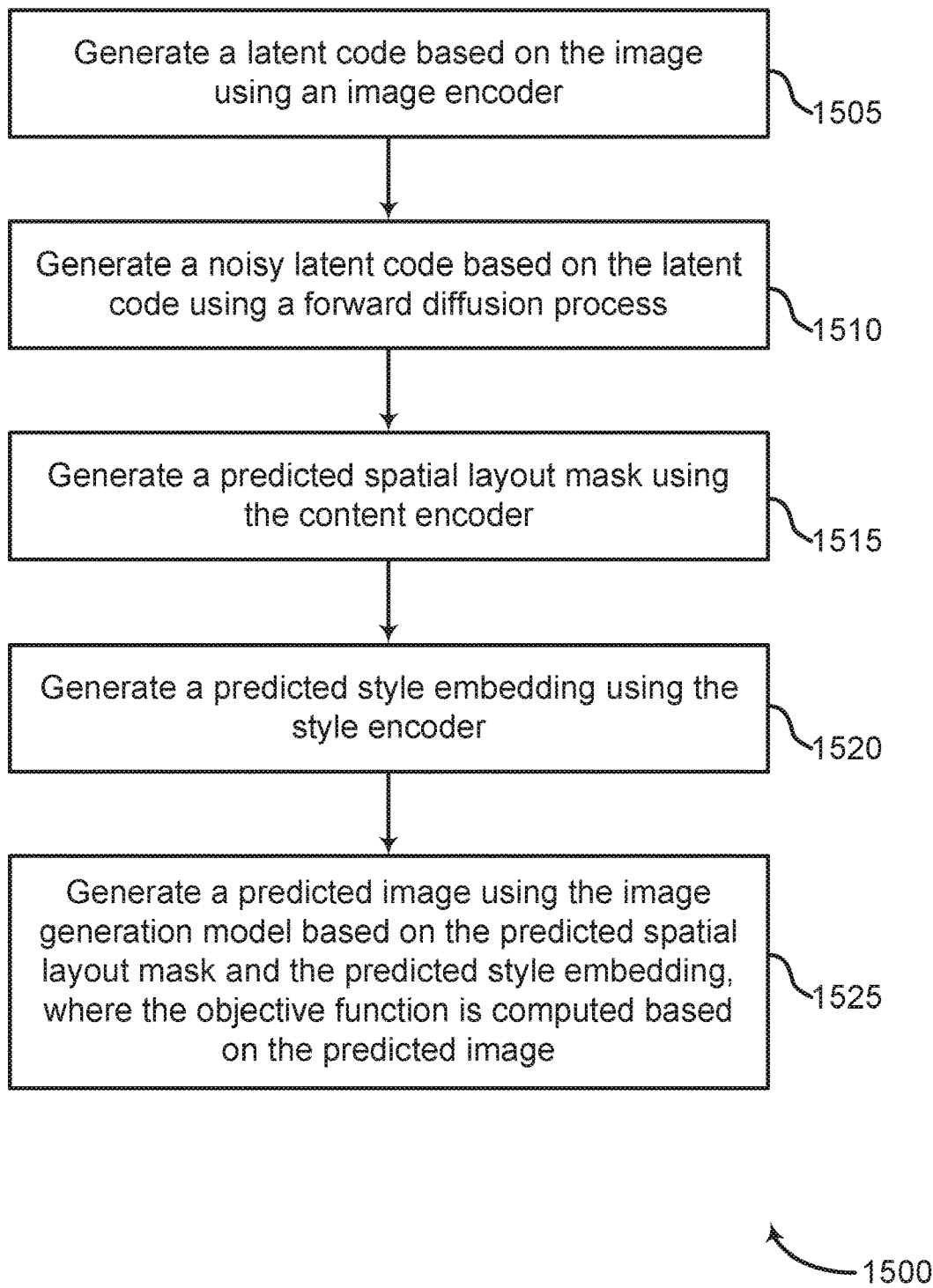
FIG. 15 shows an example of a method for training a machine learning model according to aspects of the present disclosure.

In FIGS. 13-15, a method, apparatus, and non-transitory computer readable medium for image processing are described. One or more embodiments of the method, apparatus, and non-transitory computer readable medium include initializing a content encoder, a style encoder, and an image generation model; receiving training data including an image comprising spatial content and a style attribute; computing an objective function based on the spatial content and the style attribute; and jointly training the content encoder, the style encoder, and the image generation model using an end-to-end process based on the objective function.

In some embodiments, the content encoder is trained to generate a spatial layout mask representing a target spatial layout. In some examples, the style encoder is trained to generate a style embedding representing a target style. In some examples, the image generation model is trained to generate a predicted image including a target spatial layout and a target style based on an output of the content encoder and an output of the style encoder.

Some examples of the method, apparatus, and non-transitory computer readable medium further include generating a latent code based on the image using an image encoder. Some examples further include generating a noisy latent code based on the latent code using a forward diffusion process. Some examples further include generating a predicted image using the image generation model, wherein the objective function is computed based on the predicted image.

Some examples of the method, apparatus, and non-transitory computer readable medium further include generating a predicted spatial layout mask using the content encoder. Some examples further include generating a predicted style embedding using the style encoder, wherein the predicted image is generated based on the predicted spatial layout mask and the predicted style embedding.

FIG. 13 shows an example of a method 1300 of forward and reverse diffusion according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

FIG. 13 shows an example of a method 1300 for training a diffusion model via forward and reverse diffusion according to aspects of the present disclosure. The method 1300 represents an example of training a reverse diffusion process as described above with reference to FIG. 10. In some examples, these operations are performed by a system including a processor executing a set of codes to control functional elements of an apparatus, such as the image processing apparatus 600 described in FIG. 6.

Additionally or alternatively, certain processes of method 1300 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1310, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1315, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1320, the system compares predicted image (or image features) at stage n−1 to an actual image (or image features), such as the image at stage n−1 or the original input image. For example, given observed data x, the diffusion model may be trained to minimize the variational upper bound of the negative log-likelihood $-\log p_\theta(x)$ of the training data.

At operation 1325, the system updates parameters of the model based on the comparison. For example, parameters of a U-Net may be updated using gradient descent. Time-dependent parameters of the Gaussian transitions can also be learned.

FIG. 14 shows an example of a method 1400 for training a machine learning model for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system initializes a content encoder, a style encoder, and an image generation model. In some cases, the operations of this step refer to, or may be performed by, a training component as described with reference to FIG. 6.

At operation 1410, the system receives training data including an image containing spatial content and a style attribute. In some cases, the operations of this step refer to, or may be performed by, a training component as described with reference to FIG. 6.

At operation 1415, the system computes an objective function based on the spatial content and the style attribute. In some cases, the operations of this step refer to, or may be performed by, a training component as described with reference to FIG. 6.

One or more embodiments of the present disclosure learn content latent space and style latent space. An image generation model (e.g., a diffusion model) is trained together with a content encoder $E_c(\cdot; \psi)$ and a style encoder $E_s(\cdot; \phi)$. The objective for jointly training the content encoder, the style encoder and the image generation model is formulated as follows:

$$\min_{\theta,\psi,\phi} \mathbb{E}_{z_0,\epsilon_t}\left[\|\epsilon_c - \epsilon(z_t, t, E_c(z_0; \psi), E_s(z_0; \phi); \theta)\|_2^2\right] \quad (7)$$

where $z_t=q(z_t|z_0)$ and $z_t$ is computed from the forward process of a diffusion model. In some examples, $E_c(\cdot; \psi)$ and $E_s(\cdot; \phi)$ refer to the content encoder and the style encoder, respectively. In some examples, $z_0$ and $z_t$ are referred to as latent code and forward process output, respectively.

At operation 1420, the system jointly trains the content encoder, the style encoder, and the image generation model using an end-to-end process based on the objective function. In some cases, the operations of this step refer to, or may be performed by, a training component as described with reference to FIG. 6. Jointly training the content encoder, the style encoder, and the image generation model using an end-to-end process based on the objective function is also described above in FIG. 9.

In some embodiments, the machine learning model first obtains $z_0$ from the pre-trained autoencoder, which is the input for the LDM. The external encoders $E_c(\psi)$ and $E_s(\phi)$ and the denoising UNet $\epsilon(\theta)$ are trained together without additional objective. FIG. 9 shows the details of injecting style and content information into the denoising U-Net at the l-th layer.

One or more embodiments of the present disclosure learn multiple controllable latent spaces, which are used for increased controllability. The image processing apparatus is configured to learn two latent spaces to increase controllability in diffusion models. The content encoder learns a spatial layout mask and the style encoder is trained to generate a flattened semantic code to condition the image generation model (e.g., a diffusion model having a U-Net) during training. The content and style codes are injected differently into the U-Net to ensure they encode different semantic factors of an image.

The content encoder and the style encoder are trained together with an image generation model (a diffusion model such as denoising U-Net) using an end-to-end process based on the objective function (i.e., without the need for additional objectives). This leads to reduced trainable parameters, less computation and time spent. In some examples, the content encoder learns a spatial layout mask and the style encoder outputs a flattened semantic code to condition the diffusion model during training. The joint training of the content encoder, the style encoder and the image generation model lead to increased controllability in diffusion model.

FIG. 15 shows an example of a method 1500 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system generates a latent code based on the image using an image encoder. In some cases, the operations of this step refer to, or may be performed by, an image encoder as described with reference to FIGS. 6, 7, and 9. In some examples, $z_0$ is referred to as a latent code.

At operation 1510, the system generates a noisy latent code based on the latent code using a forward diffusion process. In some cases, the operations of this step refer to, or may be performed by, a training component as described with reference to FIG. 6.

At operation 1515, the system generates a predicted spatial layout mask using the content encoder. In some cases, the operations of this step refer to, or may be performed by, a content encoder as described with reference to FIGS. 6 and 9.

In some embodiments, the shapes of $z_s$ and $z_c$ are configured asymmetrical, this way the content encoder and the style encoder can capture different semantic aspects of an image (e.g., a training image or a reference image). The content encoder $E_c(z_0; \psi)$ outputs a spatial layout mask (e.g., a content code) $z_c \in R^{1 \times h_4 \times w_4}$, where w and h are the width and height of $z_0$ latent code, respectively.

At operation 1520, the system generates a predicted style embedding using the style encoder. In some cases, the operations of this step refer to, or may be performed by, a style encoder as described with reference to FIGS. 6 and 9. In some embodiments, the style encoder $E_s(z_0; \phi)$ outputs style code $z_s \in R^{512 \times 1 \times 1}$ after global average pool layer to capture global high-level semantics.

At operation 1525, the system generates a predicted image using the image generation model based on the predicted spatial layout mask and the predicted style embedding, where the objective function is computed based on the predicted image. In some cases, the operations of this step refer to, or may be performed by, an image generation model as described with reference to FIGS. 6 and 9.

In some embodiments, at one or more layers of the denoising U-Net $\varepsilon(\cdot; \theta)$, the style code $z_s$ is applied using channel-wise affine transformation, and the content code $z_c$ is applied using spatial-wise affine transformation. The style code $z_s$ and the content code $z_c$ are applied using timestep information ($t_1$, $t_2$, and $t_3$). The interaction of the style code $z_s$ and the content code $z_c$ is further described in FIG. 9 above.

In a reverse diffusion process, low-frequency information (i.e., coarse features such as pose and facial shape) is learned in the earlier timesteps (e.g., $0<SNR(t)<10^{-2}$), and high-frequency information (e.g., fine-grained features and imperceptible details) is encoded in later timesteps (e.g., $100<SNR(t)<10^4$). The image processing apparatus is configured to include a weight scheduler for $z_c$ and $z_s$. The weight scheduler determines how much the content and the style conditions are applied to the denoising network.

In some cases, the timestep schedule is applied during inference to simulate a mixture of content and style denoising experts by changing the conditional information and the associated weight of the conditional information at each timestep. In some cases, the timestep schedule is applied during training to train a mixture of content and style experts.

Figure 16:
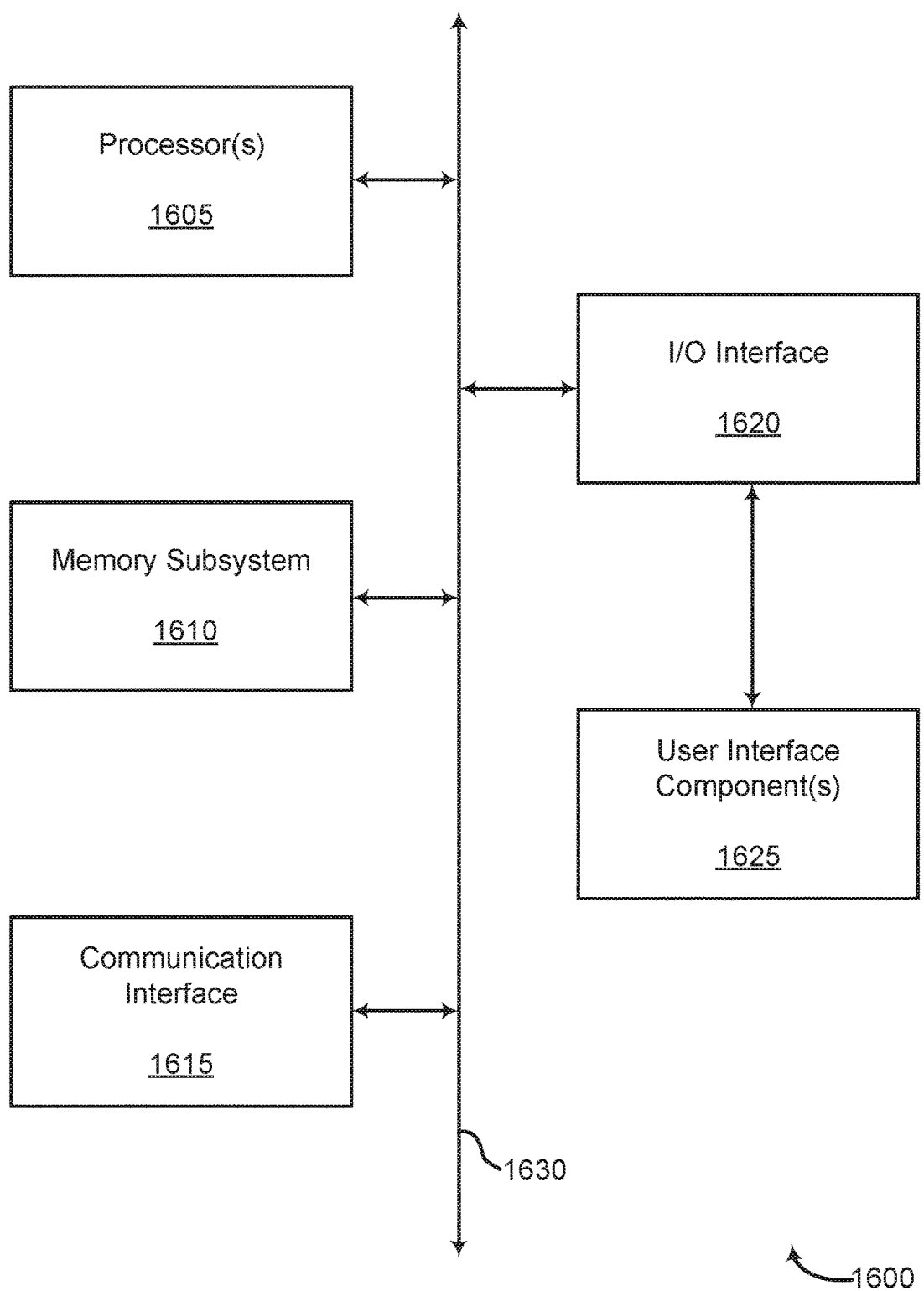
FIG. 16 shows an example of a computing device according to aspects of the present disclosure.

FIG. 16 shows an example of a computing device 1600 according to aspects of the present disclosure. The example shown includes computing device 1600, processor(s) 1605, memory subsystem 1610, communication interface 1615, I/O interface 1620, user interface component(s) 1625, and channel 1630. In one embodiment, computing device 1600 includes processor(s) 1605, memory subsystem 1610, communication interface 1615, I/O interface 1620, user interface component(s) 1625, and channel 1630.

In some embodiments, computing device 1600 is an example of, or includes aspects of, image processing apparatus 110 of FIG. 1. In some embodiments, computing device 1600 includes one or more processors 1605 that can execute instructions stored in memory subsystem 1610 to obtain a content input and a style input, wherein the content input comprises a target spatial layout and the style input comprises a target style; encode, by a content encoder, the content input to obtain a spatial layout mask representing the target spatial layout; encode, by a style encoder, the style input to obtain a style embedding representing the target style; and generate, by an image generation model, an image based on the spatial layout mask and the style embedding, wherein the image includes the target spatial layout and the target style.

According to some embodiments, computing device 1600 includes one or more processors 1605. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1610 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1615 operates at a boundary between communicating entities (such as computing device 1600, one or more user devices, a cloud, and one or more databases) and channel 1630 and can record and process communications. In some cases, communication interface 1615 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1620 is controlled by an I/O controller to manage input and output signals for computing device 1600. In some cases, I/O interface 1620 manages peripherals not integrated into computing device 1600. In some cases, I/O interface 1620 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1620 or via hardware components controlled by the I/O controller.

According to some embodiments, user interface component(s) 1625 enable a user to interact with computing device 1600. In some cases, user interface component(s) 1625 include an audio device, such as an external speaker system, an external display device such as a display screen, an input device (e.g., a remote control device interfaced with a user interface directly or through the I/O controller), or a combination thereof. In some cases, user interface component(s) 1625 include a GUI.

Performance of apparatus, systems and methods of the present disclosure have been evaluated, and results indicate embodiments of the present disclosure have obtained increased performance over existing technology. Example experiments demonstrate that the image processing apparatus outperforms conventional systems.

In some embodiments, different content images and style images from LSUN-church dataset and different random noise $x_T$ are input into the neural network to analyze the role of the denoising network $E(0)$ and the content and style encoders $E_c$ and $E_s$ by comparing encoded information in the respective latent spaces. In some cases, the content image is fixed, and the style image varies from case to case. The random noise $x_T$ is fixed to reduce stochasticity. After image translation, the structure information of the fixed content image is maintained while style information changes according to the style image.

In some cases, the content image varies from case to case, and the style image is fixed. The random noise $x_T$ is fixed as well. After image translation, the structure information of the fixed content image changes according to the content image while the style information of the fixed style image is preserved. Except for the random noise $x_T$, the white noise at each timestep during the reverse process creates additional stochasticity.

In some cases, the content image and the style image are fixed while the generation begins from different random noise $x_T$. After image translation, the output images have consistent shape, color, and texture information while minor details (such as details with regards to buildings or clouds in the output images) are changed, indicating that the denoising network plays a role in stochasticity.

Experiments have been conducted to evaluate using different timestep schedulers during sampling. The timestep schedulers are differentiated by different distributions of weight schedulers for the style-related output and the content-related output on timesteps, including the exclusive scheduling (i.e., the style weight is set to 1 if $t \leq 550$ and set to 0 otherwise), the linear scheduling (i.e., the style weight linearly decreases from 1 at t=0 to 0 at t=999 while the content weight increases linearly from 0 to 1), and the sigmoid scheduling (e.g., a sigmoid plot from $\alpha=0.025$ and b=550). These schedules are not used during training. The sigmoid scheduling provides a softer weighting scheme leading to better generations and has additional controls to obtain desired results.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining a content input and a style input, wherein the content input comprises a target spatial layout and the style input comprises a target style;
encoding, by a content encoder, the content input to obtain a spatial layout mask representing the target spatial layout;
encoding, by a style encoder, the style input to obtain a style embedding representing the target style; and
generating, by an image generation model, an image by denoising noisy features based on the spatial layout mask and the style embedding, wherein the image includes the target spatial layout and the target style.

2. The method of claim 1, wherein:
the content input comprises a content image and the style input comprises a style image.

3. The method of claim 1, further comprising:
performing a spatial-wise operation based on the spatial layout mask, wherein the image is generated based on the spatial-wise operation.

4. The method of claim 1, further comprising:
performing a channel-wise operation based on the style embedding, wherein the image is generated based on the channel-wise operation.

5. The method of claim 1, further comprising:
computing a content weight based on a diffusion timestep, wherein the image is generated based on the spatial layout mask according to the content weight.

6. The method of claim 1, further comprising:
computing a style weight based on a diffusion timestep, wherein the image is generated based on the style embedding according to the style weight.

7. The method of claim 1, further comprising:
generating a noise vector, wherein the image is generated based on the noise vector using a reverse diffusion process.

8. The method of claim 1, wherein:
the style embedding includes global semantic information representing the target style.

9. The method of claim 1, wherein:
the spatial layout mask comprises a plurality of values corresponding to a plurality of locations of the content input, respectively, and wherein the style embedding comprises a tuple of values that together represent the target style.

10. A method comprising:
initializing a content encoder, a style encoder, and an image generation model;
receiving training data including an image comprising spatial content and a style attribute;
computing an objective function based on the spatial content and the style attribute; and
jointly training the content encoder, the style encoder, and the image generation model using an end-to-end process based on the objective function.

11. The method of claim 10, wherein:
the content encoder is trained to generate a spatial layout mask representing a target spatial layout.

12. The method of claim 10, wherein:
the style encoder is trained to generate a style embedding representing a target style.

13. The method of claim 10, wherein:
the image generation model is trained to generate a predicted image including a target spatial layout and a target style based on an output of the content encoder and an output of the style encoder.

14. The method of claim 10, further comprising:
generating a latent code based on the image using an image encoder;
generating a noisy latent code based on the latent code using a forward diffusion process; and
generating a predicted image using the image generation model, wherein the objective function is computed based on the predicted image.

15. The method of claim 14, further comprising:
generating a predicted spatial layout mask using the content encoder; and
generating a predicted style embedding using the style encoder, wherein the predicted image is generated based on the predicted spatial layout mask and the predicted style embedding.

16. An apparatus comprising:
at least one processor;
at least one memory including instructions executable by the at least one processor;
a content encoder comprising parameters stored in the at least one memory and trained to encode a content input to obtain a spatial layout mask representing a target spatial layout;
a style encoder comprising parameters stored in the at least one memory and trained to encode a style input to obtain a style embedding representing a target style; and
an image generation model comprising parameters stored in the at least one memory and trained to generate an image by denoising noisy features based on the spatial layout mask and the style embedding, wherein the image includes the target spatial layout and the target style.

17. The apparatus of claim 16, wherein:
the content encoder and the style encoder each comprise a residual neural network.

18. The apparatus of claim 16, wherein:
the image generation model comprises a denoising unit.

19. The apparatus of claim 16, further comprising:
an image encoder configured to generate a latent code based on the image.

20. The apparatus of claim 16, further comprising:
a timestep scheduling component configured to compute a content weight based on a diffusion timestep, wherein the image is generated based on the spatial layout mask according to the content weight, and to compute a style weight based on the diffusion timestep, wherein the image is generated based on the style embedding according to the style weight.

* * * * *